US009824426B2

(12) United States Patent
Wu et al.

(10) Patent No.: US 9,824,426 B2
(45) Date of Patent: Nov. 21, 2017

(54) REDUCED LATENCY VIDEO STABILIZATION

(75) Inventors: Yongjun Wu, Bellevue, WA (US); Matthew Wozniak, Redmond, WA (US); Shyam Sadhwani, Bellevue, WA (US); Naveen Thumpudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 899 days.

(21) Appl. No.: 13/195,776

(22) Filed: Aug. 1, 2011

(65) Prior Publication Data

US 2013/0033612 A1   Feb. 7, 2013

(51) Int. Cl.
  H04N 5/228   (2006.01)
  H04N 5/232   (2006.01)
  G06T 5/00   (2006.01)

(52) U.S. Cl.
  CPC .... *G06T 5/002* (2013.01); *G06T 2207/20182* (2013.01); *H04N 5/23254* (2013.01); *H04N 5/23267* (2013.01)

(58) Field of Classification Search
  CPC .......... G06T 5/002; G06T 2207/20182; H04N 5/23267; H04N 5/23254; H04N 5/228
  USPC ........... 348/208.6, 222.1, 448, 607; 375/219, 375/240.01, 240.29; 725/105
  See application file for complete search history.

(56) References Cited

U.S. PATENT DOCUMENTS

| 5,259,040 A | 11/1993 | Hanna |
| 5,629,988 A | 5/1997 | Burt et al. |
| 5,748,231 A | 5/1998 | Park et al. |
| 5,973,733 A | 10/1999 | Gove |
| 6,034,730 A | 3/2000 | Ueda |
| 6,097,854 A | 8/2000 | Szeliski et al. |

(Continued)

FOREIGN PATENT DOCUMENTS

| EP | 0986252 | 3/2000 |
| JP | 10-84287 | 3/1998 |

(Continued)

OTHER PUBLICATIONS

Bosco et al., "Digital Video Stabilization through Curve Warping Techniques," *IEEE Transactions on Consumer Electronics*, vol. 54, No. 2, 6 pages (May 2008).

(Continued)

*Primary Examiner* — Reza Aghevli
(74) *Attorney, Agent, or Firm* — Klarquist Sparkman, LLP

(57) ABSTRACT

Reduced latency video stabilization methods and tools generate truncated filters for use in the temporal smoothing of global motion transforms representing jittery motion in captured video. The truncated filters comprise future and past tap counts that can be different from each other and are typically less than those of a baseline filter providing a baseline of video stabilization quality. The truncated filter future tap count can be determined experimentally by comparing a smoothed global motion transform set generated by applying a baseline filter to a video segment to those generated by multiple test filter with varying future tap counts, then settings the truncated filter future tap count based on an inflection point on an error-future tap count curve. A similar approach can be used to determine the truncated filter past tap count.

27 Claims, 14 Drawing Sheets

(56) References Cited

U.S. PATENT DOCUMENTS

| | | | |
|---|---|---|---|
| 6,798,843 B1* | 9/2004 | Wright | H03F 1/3241 330/149 |
| 7,010,174 B2 | 3/2006 | Kang et al. | |
| 7,061,524 B2 | 6/2006 | Liu et al. | |
| 7,119,837 B2 | 10/2006 | Soupliotis et al. | |
| 7,227,896 B2 | 6/2007 | Sun | |
| 7,346,109 B2 | 3/2008 | Nair et al. | |
| 7,454,136 B2 | 11/2008 | Raskar et al. | |
| 7,489,341 B2 | 2/2009 | Yang et al. | |
| 7,557,832 B2 | 7/2009 | Lindenstruth et al. | |
| 7,649,549 B2 | 1/2010 | Batur | |
| 7,929,599 B2 | 4/2011 | Ganesh et al. | |
| 8,284,205 B2 | 10/2012 | Miller et al. | |
| 8,340,185 B2 | 12/2012 | Biswas et al. | |
| 8,422,550 B2* | 4/2013 | Li | 375/240.01 |
| 8,446,433 B1 | 5/2013 | Mallet et al. | |
| 8,531,535 B2 | 9/2013 | Kwatra et al. | |
| 8,606,009 B2 | 12/2013 | Sun | |
| 8,711,248 B2 | 4/2014 | Jandhyala et al. | |
| 8,769,207 B2 | 7/2014 | Jiao et al. | |
| 8,896,715 B2 | 11/2014 | Wu et al. | |
| 9,374,532 B2 | 6/2016 | Grundmann et al. | |
| 9,571,856 B2 | 2/2017 | Sun et al. | |
| 2003/0072373 A1 | 4/2003 | Sun | |
| 2004/0001705 A1 | 1/2004 | Soupliotis et al. | |
| 2004/0027454 A1 | 2/2004 | Vella et al. | |
| 2004/0071363 A1* | 4/2004 | Kouri et al. | 382/276 |
| 2005/0046702 A1* | 3/2005 | Katayama et al. | 348/222.1 |
| 2005/0099504 A1 | 5/2005 | Nayar et al. | |
| 2005/0206785 A1* | 9/2005 | Swan et al. | 348/448 |
| 2006/0066728 A1 | 3/2006 | Batur | |
| 2006/0274156 A1 | 12/2006 | Rabbani et al. | |
| 2006/0280334 A1 | 12/2006 | Rav-Acha | |
| 2007/0014470 A1 | 1/2007 | Sloan | |
| 2007/0091090 A1 | 4/2007 | Zhang | |
| 2007/0132852 A1 | 6/2007 | Yu | |
| 2007/0201560 A1 | 8/2007 | Segall et al. | |
| 2007/0201562 A1 | 8/2007 | Ganesh et al. | |
| 2007/0242900 A1 | 10/2007 | Chen et al. | |
| 2007/0292047 A1 | 12/2007 | Jiao et al. | |
| 2007/0297513 A1 | 12/2007 | Biswas et al. | |
| 2008/0060034 A1* | 3/2008 | Egnal et al. | 725/105 |
| 2008/0232445 A1* | 9/2008 | Forsell | 375/219 |
| 2008/0246848 A1 | 10/2008 | Tsubaki et al. | |
| 2009/0051777 A1 | 2/2009 | Lee et al. | |
| 2009/0079876 A1 | 3/2009 | Takeshima et al. | |
| 2009/0109219 A1 | 4/2009 | DeCoro et al. | |
| 2009/0180555 A1 | 7/2009 | Sun et al. | |
| 2009/0244299 A1 | 10/2009 | Fukunishi | |
| 2009/0256918 A1 | 10/2009 | Rabinowitz et al. | |
| 2009/0263009 A1 | 10/2009 | Krishnaswamy et al. | |
| 2010/0183071 A1 | 7/2010 | Segall et al. | |
| 2010/0208087 A1 | 8/2010 | Ogawa | |
| 2010/0271512 A1 | 10/2010 | Garten | |
| 2010/0302448 A1* | 12/2010 | Zhu | 348/607 |
| 2011/0019014 A1 | 1/2011 | Oh et al. | |
| 2011/0193978 A1* | 8/2011 | Wu | H04N 5/23248 348/208.6 |
| 2012/0105654 A1 | 5/2012 | Kwatra et al. | |
| 2012/0218442 A1 | 8/2012 | Jandhyala et al. | |
| 2013/0265460 A1 | 10/2013 | Wu et al. | |
| 2014/0267801 A1 | 9/2014 | Grundmann et al. | |

FOREIGN PATENT DOCUMENTS

| | | |
|---|---|---|
| JP | 2007-049545 | 2/2007 |
| JP | 2007-072573 | 3/2007 |
| JP | 2007-166578 | 6/2007 |
| JP | 2007-328693 | 12/2007 |
| JP | 2008-053875 | 3/2008 |
| JP | 2008-252651 | 10/2008 |
| JP | 2009-081734 | 4/2009 |
| JP | 2009-527991 | 7/2009 |
| JP | 2009-230537 | 10/2009 |
| KR | 2009-0034836 | 4/2009 |
| RU | 2377735 | 12/2009 |
| TW | I246283 | 12/2005 |
| TW | 200933524 | 8/2009 |
| WO | WO 2007/146574 | 8/2007 |
| WO | WO 2008/057841 | 5/2008 |

OTHER PUBLICATIONS

Olympus—Image Stabiliser, downloaded from http://www.olympus-europa.com/consumer/dslr_16742.htm#16745, 1 pg. (document not dated, downloaded on May 4, 2011).

Pal et al., "Employing DSPs for Image Stabilization," *EE Times-Asia*, downloaded from http://www.eetasia.com/STATIC/PDF/200908/ EEOL_2009AUG21_DSP_TA_01.pdf?SOURCES=DOWNLOAD, 4 pp. (Aug. 21, 2009.).

Patel, "Video Stabilization & Integration with H.264 Encoder," Master of Technology Dissertation, VLSI Design Tools and Technology Indian Institute of Technology Delhi, 46 pages (May 2009).

Vermeulen, "Real-time Video Stabilization for Moving Platforms," *21st Bristol UAV Systems Conference*, Apr. 2007, pp. 1-14 (2007).

U.S. Appl. No. 12/197,922, filed Aug. 25, 2008, Sun et al.

U.S. Appl. No. 12/700,292, filed Feb. 4, 2010, Sun.

Battiato et al., "A Robust Video Stabilization System by Adaptive Motion Vectors Filtering," *2008 IEEE Int'l Conf. on Multimedia and Expo*, 4 pp. (Jun. 23, 2008).

Battiato et al., "Fuzzy-based Motion Estimation for Video Stabilization using SIFT interest points," *Proc. of SPIE*, vol. 7250, 8 pp. (Jan. 19, 2009).

Bergen et al., "Hierarchical Model-Based Motion Estimation," *Proc. of the Second European Conf. on Computer Vision*, 16 pp. (1992).

Bill Crow's Digital Imaging & Photography Blog, "JPEG XR is Now an International Standard," 2 pp., downloaded from http://blogs.msdn.com/b/billcrow/archive/2009/07/29/jpeg-xr-is-now-an-international-standard.aspx (document marked Jul. 29, 2009).

Debevec et al., "Recovering High Dynamic Range Radiance Maps from Photographs," *Proc. 24th Annual Conf. on Computer Graphics and Interactive Techniques*, 10 pp. (1997).

Drago et al., "Design of a Tone Mapping Operator for High Dynamic Range Images based upon Psychophysical Evaluation and Preference Mapping," *SPIE Proc. on Human Vision and Electronic Imaging VIII*, vol. 5007, pp. 321-331 (Jun. 2003).

Duran et al., "Fast Bilateral Filtering for the Display of High-Dynamic-Range Images," *Proc. 29th Annual conf. on Computer Graphics and Interactive Techniques*, vol. 21, No. 3, pp. 257-266 (Jul. 2002).

Fattal et al., "Gradient Domain High Dynamic Range Compression," *Proc. Annual Conf. on Computer Graphics and Interactive Techniques*, vol. 21, Issue 3, 8 pp. (Jul. 2002).

Gallo et al., "Artifact-free High Dynamic Range Imaging," *IEEE Int'l Conf. on Computational Photography*, 7 pp. (Apr. 2009).

Lucas et al., "An Iterative Image Registration Technique with an Application to Stereo Vision," *Proc. 7th Int'l Joint Conf. on Artificial Intelligence*, vol. 2, pp. 674-679 (Aug. 1981).

U.S. Appl. No. 12/704,047, filed Feb. 11, 2010, Wu et al.

Mann et al., "Painting with Looks: Photographic images from video using quantimetric processing," *ACM Multimedia*, 10 pp. (2002).

Mitsunaga et al., "Radiometric Self Calibration," *IEEE*, pp. 374-380 (Jun. 1999).

Nayar et al., "High Dynamic Range Imaging: Spatially Varying Pixel Exposures," *IEEE Proc. on Computer Vision and Pattern Recognition*, vol. 1, pp. 472-479 (Jun. 2000).

Peng et al., "DSP Implementation of Digital Image Stabilizer," *IEEE Int'l Conf. on Multimedia and Expo*, 4 pp. (Jul. 2005).

Qiu et al., "Hierarchical Tone Mapping for High Dynamic Range Image Visualization," *Proc. SPIE Visual Communications and Image Processing*, vol. 5960, 9 pp. (Jun. 2005).

Reinhard et al., "Photographic Tone Reproduction for Digital Images," *Proc. 29th Annual conf. on Computer Graphics and Interactive Techniques*, vol. 21, No. 3, pp. 267-276 (Jul. 2002).

(56) References Cited

OTHER PUBLICATIONS

Tang, "HDR Photos and Photoshop," 13 pp., downloaded from http://photoshoptutorials.ws/photoshop-tutorials/general/basics/hdr-photos-and-photoshop.html (document marked Apr. 6, 2008).

Tang, "Layered HDR Tone Mapping," 12 pp., downloaded from http://photoshoptutorials.ws/photoshop-tutorials/photo-manipulation/layered-hdr-tone-mapping.html (document marked May 30, 2007).

Tsin et al., "Statistical Calibration of CCD Imaging Process," *IEEE Proc. Int'l Conf. on Computer Vision*, 8 pp. (Jul. 2001).

Wikipedia, "Covariance," 3 pp., downloaded from http://en.wikipedia.org/wiki/Covariance (downloaded on May 13, 2011).

Wikipedia, "Cross-correlation," 4 pp., downloaded from http://en.wikipedia.org/wiki/Cross-correlation#Normalized_cross-correlation (downloaded on Dec. 30, 2009).

Wikipedia, "High dynamic range rendering," 7 pp., downloaded from http://en.wikipedia.org/wiki/High_dynamic_range_rendering (downloaded on Jan. 5, 2010).

Wikipedia, "Sum of absolute differences," 2 pp., downloaded from http://en.wikipedia.org/wiki/Sum_of_absolute_differences (downloaded on May 13, 2011).

Zimmer et al., "Freehand HDR Imaging of Moving Scenes with Simultaneous Resolution Enhancement," 24 pp. (document marked Dec. 2010).

Adda et al., "A Tool for Global Motion Estimation and Compensation for Video Processing," Concordia University, Electrical and Computer Engineering Department, Final Year Project ELEC/COEN 490, Final Report, 60 pp. (May 2003).

Karpenko et al., "Digital Video Stabilization and Rolling Shutter Correction Using Gyroscopes," Stanford Tech Report CTSR 2011-03, 7 pp. (2011).

Matsushita et al., "Full-frame Video Stabilization," *Proc. Computer Vision and Pattern Recognition*, 8 pp. (2005).

Szeliski, "Image Alignment and Stitching: A Tutorial," Microsoft Research, Technical Report MSR-TR-2004-92, 89 pp. (Dec. 2006).

Blythe, "The Direct3D 10 System," ACM Trans. on Graphics, pp. 724-734 (Jul. 2006).

Notice of Allowance dated Sep. 12, 2016, from Taiwanese Patent Application No. 104133387, 4 pp.

Notice of Preliminary Rejection dated Oct. 11, 2016, from Korean Patent Application No. 10-2012-7020922, 8 pp.

Notice of Preliminary Rejection dated Nov. 9, 2016, from Korean Patent Application No. 10-2015-7031199, 6 pp.

* cited by examiner

DOWNSAMPLING FOR PYRAMIDAL BLOCK MOTION ESTIMATION

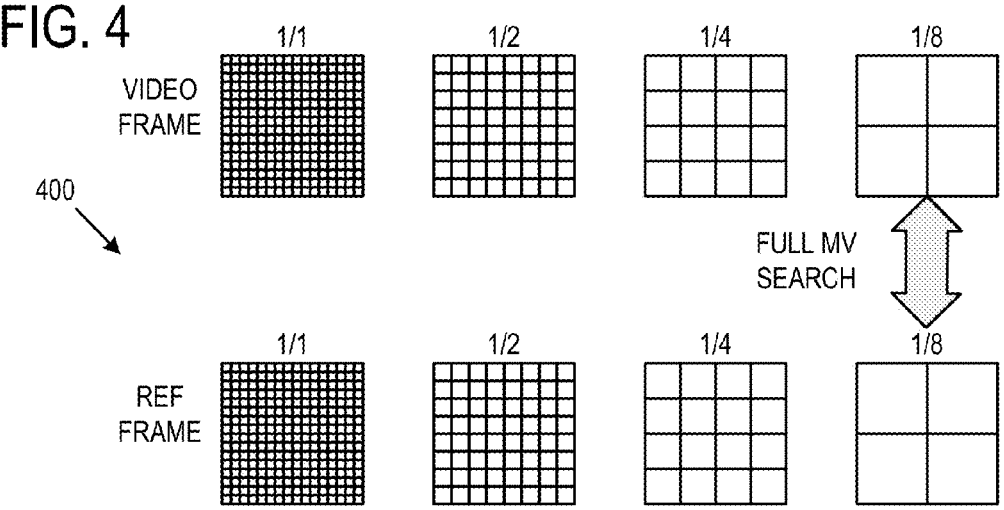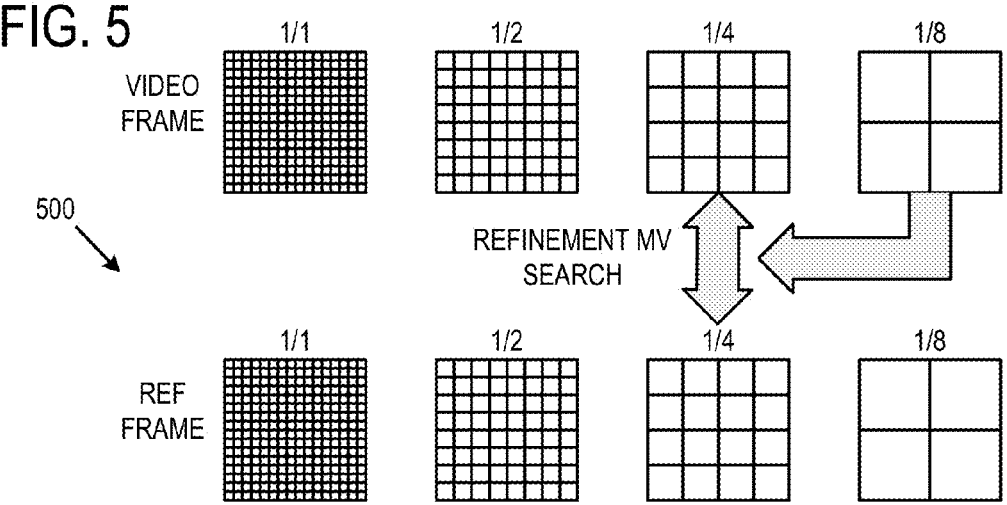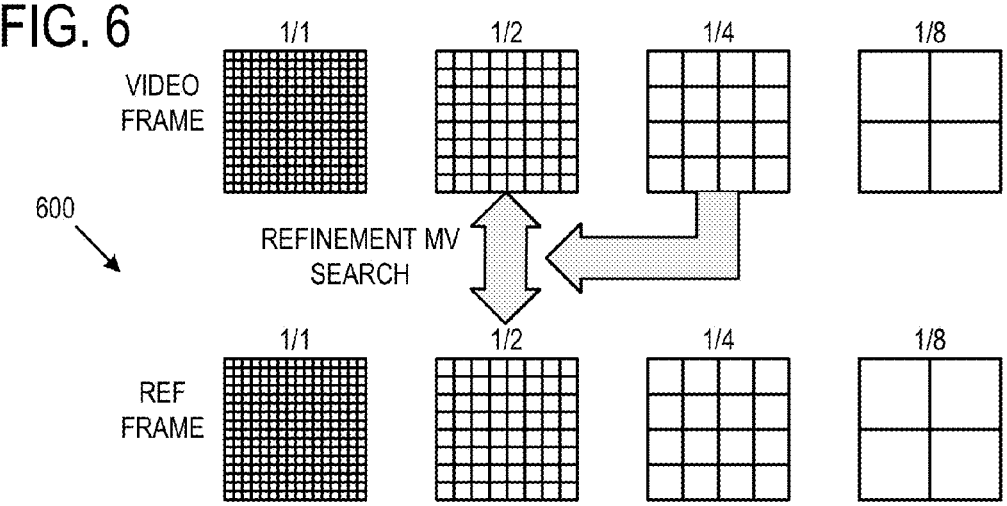

GLOBAL MOTION TRANSFORM MODELS

REDUCED LATENCY VIDEO STABILIZATION

BACKGROUND

It is increasingly common for video camera capabilities to be incorporated into multi-purpose, small and lightweight handheld electronic devices, such as mobile phones, compact cameras and media players. Unlike the larger dedicated-purpose video camcorders, such multi-purpose handheld devices typically lack any mechanical or optical mechanism to reduce jittery video motion due to a shaky or unsteady hand or other causes. Due to their lighter weight and typical use of a wide-angle lens, the multi-purpose handheld devices can be more susceptible to jittery video motion from hand shakiness or other causes. Further, as the availability of these inexpensive multi-purpose handheld devices spreads the popularity of shooting video beyond the community of amateur and professional videographers, consumer video is more and more commonly produced by users with very little training or experience in how to shoot quality video. There is also a growing popularity among consumers to share short video clips over the Internet via email, blogs, video sharing web sites and social networking sites. Particularly for those users who are not videography professionals or hobbyists, the video clips are often uploaded to the web site (sometimes directly from the video capture device) without any editing or other processing. For these various reasons, the quality of video clips shared on the web is very often quite poor, and the video clips commonly suffer from jittery video motion.

Digital video image stabilization is a digital signal processing technique that can be applied to video to correct jittery video motion. In one exemplary implementation, the technique involves local motion estimation for macroblocks of each image of the video sequence relative to its close by images; processing the local motion vectors of the macroblocks to produce an estimate of the global motion due to jitter; and then compensating for the jittery video motion by digital shifting or warping the image in a direction opposite the estimated jitter motion.

One drawback of known digital video image stabilization is that the technique is quite computationally intensive. When uploading video to a blog, video sharing web site or social networking web site, the video may be uploaded from devices that vary in processing capabilities. Moreover, the casual user may be more interested in the immediacy of quickly posting their video to a video sharing or social networking site, such that any time consumed processing the video is undesirable. For example, video may be uploaded directly from a multi-purpose handheld device, such as over a cellular network. However, the multi-purpose handheld device (such as a mobile phone) often has limited processing resources, or must share processing resources with other capabilities of the multi-purpose device. Alternatively, the handheld device or other device with video capture capability could be connected to a PC, laptop, netbook or like devices with internet connectivity to upload video to a video sharing or social networking site. However, these internet-connected PCs also vary greatly in processing resources. Also, in the interest of immediacy, any processing delays during posting via an internet-connected device can be undesirable.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

The following Detailed Description pertains to methods and tools that reduce the latency and memory usage of video image stabilization. Reduced latency and memory usage can be desirable for applications such as those involving real-time communication or those in which the amount of memory in a device is limited. For example, global motion transforms corresponding to jittery video motion can be smoothed using a truncated filter that has a reduced number of taps (relative to a baseline filter) providing a given level of video stabilization quality. A number of taps to be used in the truncated filter can be determined experimentally by applying a set of test filters having varying numbers of future taps to the global motion transforms. The experiments can be performed on a single video segment or on multiple video segments containing a variety of local and global motions scenarios. The error between the smoothed global motion transforms generated with the baseline filter and those generated with each of the test filters is calculated and an inflection point along an error-future tap curve identified to determine a number of future taps to be used in a temporal smoothing filter. A similar approach can be taken to determine a number of past taps for a smoothing filter.

Once a number of future taps and past taps count are determined, global motion transforms can be temporally smoothed with a truncated filter having the determined truncated filter future and past tap counts to provide motion transform processing having reduced latency and memory usage relative to processing using the baseline filter. The reduced latency results in part from using a truncated filter that uses information temporally closer to a current frame relative to the baseline filter. That is, a device performing video image processing on the fly does not need to wait as long before it has the frames needed to perform smoothing on a given frame. Memory usage is reduced in part by the having to store fewer look-ahead frames of video data to perform the temporal smoothing.

In one example, a truncated filter for use in temporal smoothing of global motion transforms representing jittery video motion is a 7-tap filter utilizing information from the current frame, two future frames and four past frames. That is, the filter has a future tap count of 2 and a past tap count of 4.

The foregoing and other objects, features, and advantages of the invention will become more apparent from the following detailed description, which proceeds with reference to the accompanying figures.

BRIEF DESCRIPTION OF THE DRAWINGS

FIGS. 4-7 are diagrams illustrating exemplary processing of a video frame for pyramid block-based local motion estimation.

DETAILED DESCRIPTION

Figure 1:
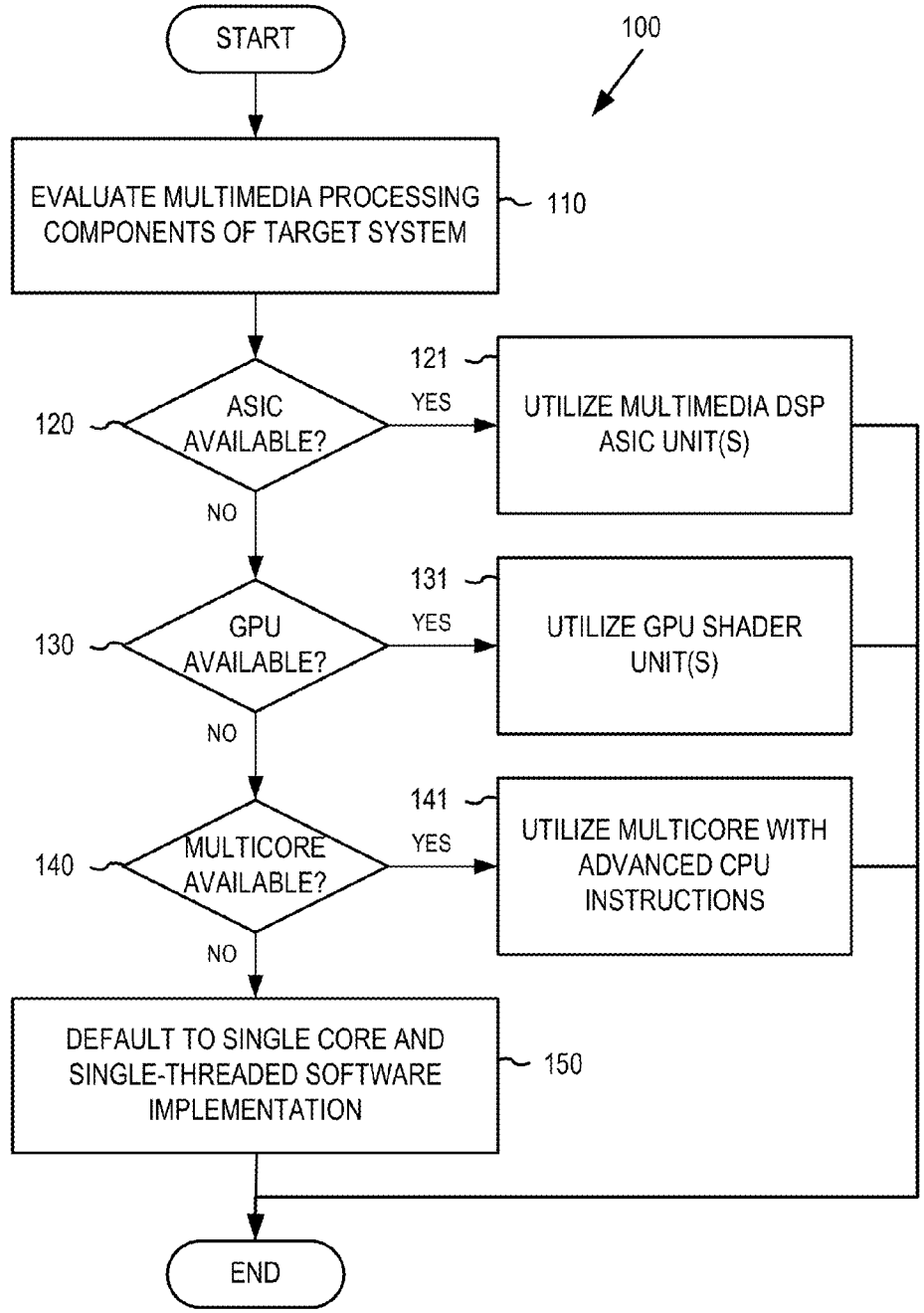
FIG. 1 is a flow diagram of an exemplary method for a generic platform digital video image stabilization technique to effectively utilize available multimedia digital signal processing components according to a computation performance hierarchy.

The following Detailed Description concerns systems and techniques to provide digital video image stabilization, and more particularly concerns digital video image stabilization techniques operable on a generic computation hardware platform while effectively utilizing available multimedia digital signal processing (DSP) hardware components, and digital video image stabilization techniques having reduced latency and memory usage. The digital video image stabilization techniques can be practiced across a variety of hardware devices, including handheld and portable computing devices, video cameras, mobile phones, entertainment consoles (e.g., video game consoles and television set-top box), various network client computers (e.g., personal computers, laptop, netbook, and tablet computers), as well as server computers. The digital video image stabilization techniques can also be used in a variety of usage and computation scenarios, including video processing on a dedicated video capture device, video processing on a stand-alone computer, video processing on a network client computer and video processing on a server computer. Further, various parts of the digital video image stabilization technique can be performed in parallel or cooperatively on multiple computing devices, such as in a client/server, network "cloud" service or peer computing arrangement, among others. Accordingly, it should be recognized that the techniques can be realized on a variety of different electronic and computing devices, including both end user consumer operated devices as well as server computers that may provide the techniques as part of a service offering to customers.

Hierarchical Selection of Multimedia DSP Components on Generic Platform for Digital Video Image Stabilization The processing of video, and more particularly the processing of the digital video image stabilization techniques described herein, is inevitably computationally intensive. On the other hand, the digital video image stabilization techniques can be practiced on a variety of computing devices, whose configuration of multimedia processing hardware components can vary widely from each other. One way for the digital video image stabilization techniques described herein to achieve better potential performance and quality is that the techniques evaluate the target computing device on which they are run, and choose to utilize available multimedia processing components according to a hierarchy constructed in a way that considers one or more aspects of performance, quality, power consumption, conformance, and robustness. In this way, the digital video image stabilization techniques are developed for a generic operating platform, and then adapt to best utilize multimedia processing capabilities of the actual target computing hardware on which they are run.

In one example implementation, the digital video image stabilization techniques described below are implemented in an executable program to be run on a computing device (described in more detail below), such as a dynamic link library (DLL) file or as an application program executable file. When implemented as a DLL or other executable library file, the executable program implements the digital video image stabilization as a set of library functions, and provides a programmatic interface for application programs to make programmatic use of the digital video image stabilization functionality implemented by the executable program. The executable program runs on a generic platform or computing environment, which is to say that the executable program can run on a variety of computers and computing devices that may include varying multimedia digital signal processing (DSP) components.

With reference to FIG. 1, the digital video image stabilization library program includes programming to perform video processing for the digital video image stabilization using various multimedia DSP components that potentially may be available on the target computing device on which the program is run. The program then adapts to best utilize the multimedia DSP components via the exemplary multimedia utilization hierarchy process 100. In a first action 110 of this process 100, the library program evaluates the multimedia DSP components of the target computing system or device on which it has been installed and is being run. The library program can perform this evaluation by making a call to an operating system service for querying system information, by examining system information recorded in a registry or other system database, by calling programming interfaces associated with multimedia DSP components, by attempting access to multimedia DSP components or by other like ways to access system information and/or query the presence of hardware components.

Based on the results of the evaluation in action 110, the library program then chooses from the multimedia DSP components determined to be available on the target computing device according the processing hierarchy. In the illustrated example, the library program first chooses to utilize any available ASIC units that are adapted for multimedia DSP in the target computing device as shown in actions 120-121. Examples of current commercially available such ASIC units include video cards from Intel (known by the name Larrabee) and Nvidia (named Tesla). If no such ASIC units are available on the target device, the library program next chooses to utilize any available graphics processing unit with shader capability on the target device as shown in actions 130-131. If no ASIC or GPU shader components are present, the library program chooses to utilize any available multicore processor or central processing unit with advanced multimedia instruction set (e.g., SSEx instructions). Finally, if none of these higher performance multimedia DSP components are available on the target device, the library program falls back to performing video processing of the digital video image stabilization techniques on a single core CPU using a single-threaded software implementation as shown in action 150. In other alternative implementations, other hierarchies of multimedia DSP components can be used based on consideration of the above-mentioned aspects of performance, quality, power consumption, conformance, and/or robustness for multimedia DSP components that may then be available in commercially available computing device hardware of the generic platform. Such alternative implementations can include utilization of fewer or additional multimedia DSP components than in the illustrated hierarchical multimedia DSP utilization process 100.

Digital Video Image Stabilization on Generic Platform

Figure 2:
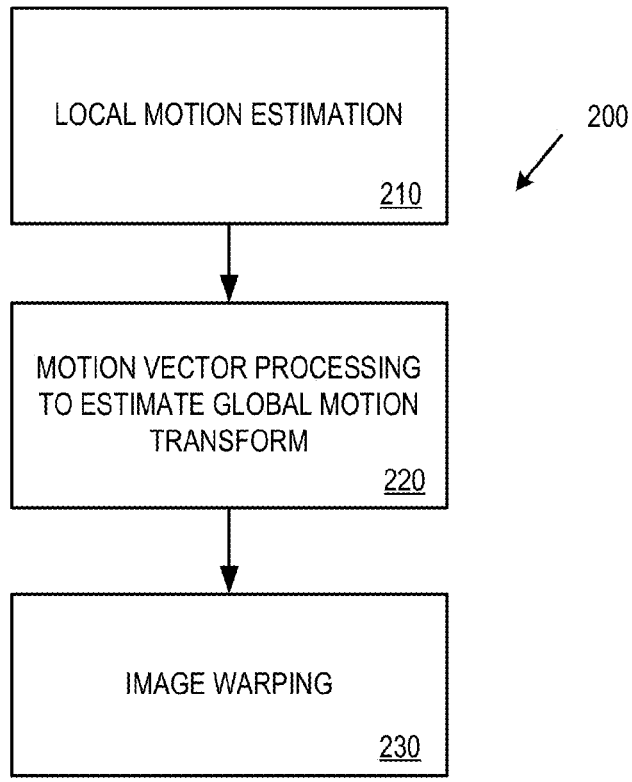
FIG. 2 is a flow diagram of an exemplary three-part digital video image stabilization process, which utilizes available multimedia digital signal processing components of the target computing device according to the hierarchical utilization process of FIG. 1.

As illustrated in FIG. 2, the digital video image stabilization techniques include processing of a subject video involving generally three parts: local motion estimation 210, motion vector processing 220 to estimate a global motion transform corresponding to video jitter from hand shakiness or other causes, and image warping 230 to compensate the video jitter motion. The local motion estimation 210 and image warping 230 are computationally intensive, and most desirably are done using the choice from any available multimedia DSP components on the target computing device chosen according to the hierarchical DSP utilization shown in FIG. 1 and discussed above. For example, a form of the local motion estimation 210 that is particularly suited for processing utilizing GPU shaders can be implemented in the library program and used to accomplish the local motion estimation part of the digital video image stabilization when the target computing device has a GPU shader capability among its available multimedia DSP components. On the other hand, the library program can include the functionality to perform the image warping 230 using a D3D API call when the evaluated target computing device is determined to possess that capability among its available multimedia DSP components or GPU. The second part 220, processing local motion vectors to estimate the global motion transform is done on the CPU in the example implementation.

Pyramid Block-Based ME on GPGPU

In one example implementation, the library program for the digital video image stabilization includes programming to implement the local motion estimation 210 using a pyramid block-based motion estimation technique illustrated in FIGS. 3-7 that is particularly well suited for processing in a GPU shader (when determined to be available on the target computing device by the process 100 discussed above). As compared to individually estimating local motion for blocks of the full resolution video frames, the pyramid block-based motion estimation technique also emphasizes global motion of the video frame, which is well suited to estimating overall global motion of video frames for the digital video image stabilization.

The pyramid block-based motion estimation performs motion estimation for each frame of the video relative to a reference frame. In general, the reference frame is a consecutive frame (e.g., the immediately preceding or following frame) in the video sequence. Alternatively, every third frame can be used as a reference for the next two frames of video, or other selection of reference frame can be made. For the motion estimation, the video frame is divided into a regular grid of blocks, and the motion estimation calculates a motion vector or displacement of each block of the video frame relative to closely matching image content in the reference frame.

Figure 3:
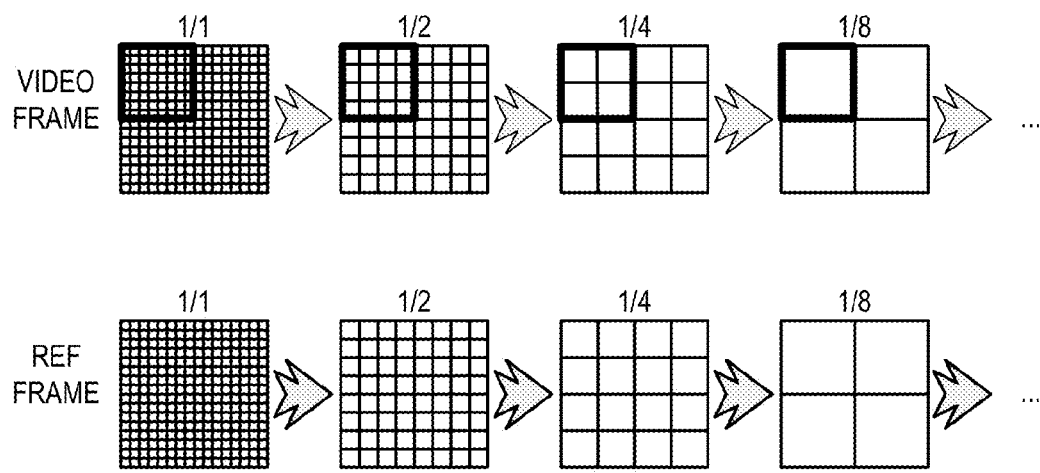
FIG. 3 is a diagram illustrating an exemplary downsampling of a video frame for pyramid block-based local motion estimation.

The pyramid block-based motion estimation begins by repeatedly downsampling the resolution of both the video frame and its reference frame by half using a downsampling shader on the GPU of the computing device. In the example shown in FIG. 3, the video frame and reference frame are downsampled by half three times over to produce versions of the video frame and reference frame at full resolution, ½ resolution, ¼ resolution and ⅛ resolution. The video frame and reference frame can be downsampled in resolution a fixed number of times, or can be downsampled a variable number of times dependent on the size and original resolution of the video frame according to available image buffer space and processing resources of the computing device. Alternatively, the video frame and reference frame can be downsampled fewer or more times than the example shown in FIG. 3. It should be understood that the example illustrated in FIG. 3 is illustrative only, and actual video frames processed by the digital video image stabilization technique generally would have a larger number of pixels and higher original resolution than the example shown.

For each resolution of the video frame, the pyramid block-based motion estimation divides the video frame into a grid of blocks. The same size of block is used at each resolution. Preferably a relatively large block size, such as 16×16 or 8×8 pixels is used. In this way, each block of the lowest resolution image will split into 4 blocks of the same block size at the corresponding location in the next higher resolution image, which effectively provides a pyramid structure or hierarchy relationship of blocks in the lowest resolution image to those at the corresponding location in the higher resolution images. For purposes of illustration, the blocks in the higher resolution versions of the video frame (i.e., 1/1, ½ and ¼ resolution) that are in a pyramid structure relationship to the upper-left block of the ⅛ resolution image are shown within the thick line boundary in FIG. 3.

Next, the pyramid block-based motion estimation performs a full search based on sum of absolute difference (SAD) on each block in the lowest resolution image over the full reference frame to find a position of matching image content in the reference frame. This produces a local motion vector of each block in the lowest resolution video frame corresponding to its displacement from matching image content in the reference frame. This full search is performed at the lowest resolution version of the video frame and reference frame only as shown in FIG. 4.

Figure 7:
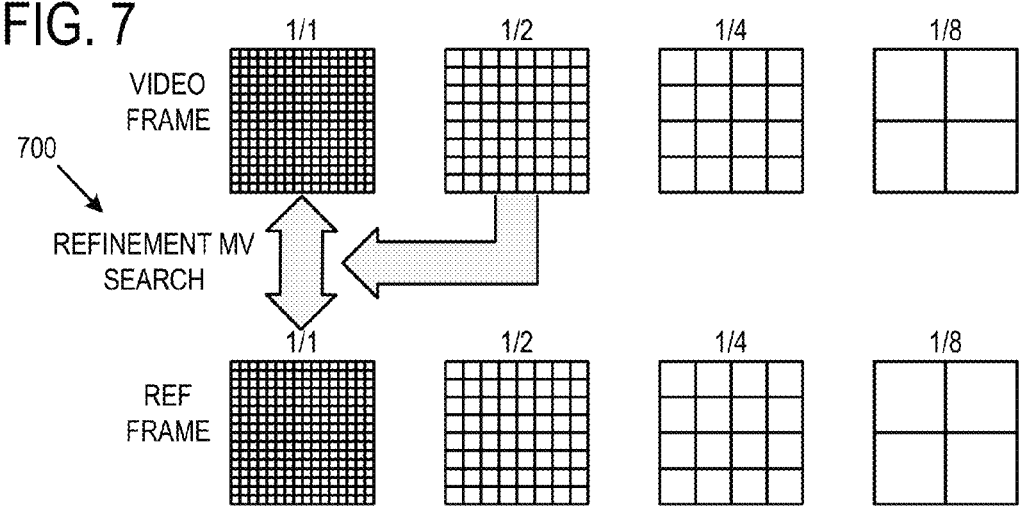

As illustrated in FIGS. 5-7, the pyramid block-based motion estimation then performs refinement motion estimation searching at each successive higher resolution version of the video frame relative to the reference frame up to the original resolution video frame. The refinement search is done in a reduced search window, such as ¼ or ⅛ of the full search window. As previously mentioned, each block of a lower resolution image splits into four blocks at the corresponding location of the next higher resolution version of the video frame. The motion vector calculated via the motion estimation search for the block in the lower resolution image is used as the starting point of refinement motion estimation searches for each of the four blocks in the pyramid structure at the next higher resolution version of the video frame. This refinement search using the pyramid structure relationship of the blocks in the lower resolution video frame to the four corresponding blocks in the next higher resolution video frame emphasizes consistency in the motion estimation calculation among neighboring blocks. As the refinement search is repeated for each successive higher resolution version of the video frame, this emphasized consistency among neighbors provides a more consistent set of local motion vectors for the blocks in the original resolution image upon which to base the global motion transform estimation discussed below.

Once the GPU shader finishes the local motion estimation at the original video frame resolution, the motion vector along with the sum of differences result and variance for each block of the original resolution video frame is copied to the CPU for the global motion transform estimation.

Motion Vector Processing for Global Motion Transform Estimation

With reference again to FIG. 2, the motion vector processing to estimate global motion transform part 220 of the digital video image stabilization process 200 in one example implementation is performed on the central processing unit (CPU) of the computing device. The digital video image stabilization techniques can use a single-pass mode of the motion vector processing, which is suitable for real time processing during video playback, video streaming or transmission. Alternatively, a two-pass mode of the motion vector processing can be employed that provides a better video stabilization quality at a cost of increased computation time. The two-pass mode therefore may be more suitable for off-line video processing scenarios, which are not subject to the time constraints of real time video playback and for which a high video stabilization quality is desired.

Figure 8:
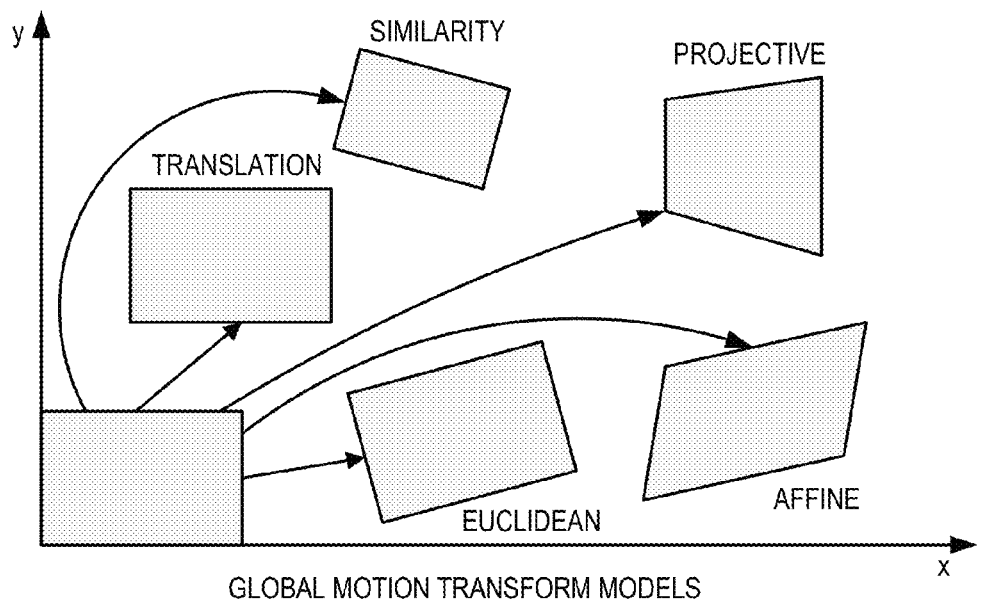
FIG. 8 is a diagram illustrating global motion transform models, including a similarity model of global motion transform used for digital video image stabilization.

FIG. 8 illustrates various global motion transform models that could be used to estimate jittery video motion from hand shakiness or other causes, including translation similarity, Euclidean, projective and affine motion transform models. In an example implementation presented herein, the motion vector processing uses the similarity global transform model with translation, rotation and zoom parameters as shown in the following equation (1):

$$\begin{bmatrix} x' \\ y' \\ 1 \end{bmatrix} = \begin{bmatrix} s\cos\beta & s\sin\beta & tx \\ -s\sin\beta & s\cos\beta & ty \\ 0 & 0 & 1 \end{bmatrix} \cdot \begin{bmatrix} x \\ y \\ 1 \end{bmatrix} \quad (1)$$

where x and y are the original position, x' and y' are the transformed position, and s, $\beta$, $t_x$, $t_y$ are zoom, rotation and translation parameters, respectively.

In general, most users will experience shaky motion effects on translation, rotation and zoom only. Accordingly, the similarity motion transform model fits the application of video stabilization well to model the hand shakiness of the camera operator or other shakiness (e.g., from environmental factors) at the time of video capture. However, alternative implementations of the global motion transform estimation could use other models that model additional or fewer aspects of video jitter from shakiness.

One-Pass Motion Vector Processing in Real Time Mode

Figure 9:
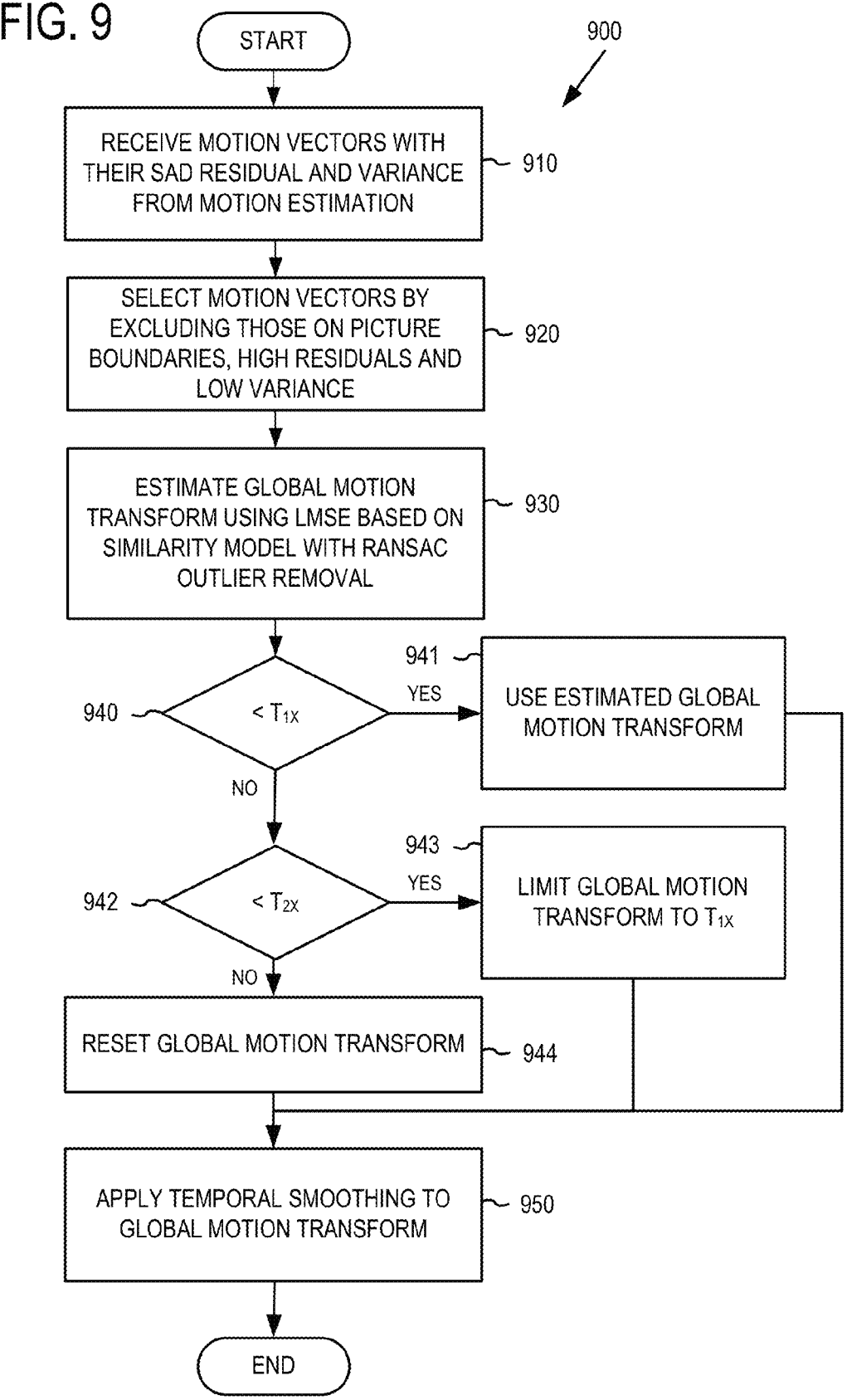
FIG. 9 is a flow diagram illustrating an exemplary single-pass processing of motion vectors for a video frame to estimate a global motion transform of jitter motion due to hand shakiness or other causes, such as for use in a real time mode digital video image stabilization.

FIG. 9 illustrates an example implementation of a one-pass motion vector processing 900 for estimating global motion transform of video frames, which is suitable for a real time processing mode. The motion vector processing is applied to the motion vectors for each video frame of a scene in a video sequence, such as those produced via the pyramid block-based motion estimation described above. The example implementation begins at action 910 by receiving information of the motion vectors for a video frame. In addition, the example motion vector processing 900 also receives information of the residual value for each block relative to that of its matching block at the motion vector position in the reference frame, which can be the sum of absolute differences (SAD) value calculated during the motion vector estimation. Further, the example motion vector processing 900 receives a value of the variance in image content of the original block in the video frame, which may also be calculated during the motion vector estimation.

In action 920, the one-pass motion vector processing 900 selects a set of the more reliable motion vectors upon which to base the global motion transform estimation. In one example implementation, the one-pass motion vector processing 900 selects motion vectors based on three rules. First, the motion vectors on picture boundaries may not be reliable, and therefore are not selected. For example, after camera motion from frame to frame, picture contents at the boundary blocks may be partially missing. Second, a large residual error after motion compensation of a block (e.g., the SAD value for the block is large) may indicate unreliable motion estimation. The motion vectors for blocks with large motion compensation residuals (as indicated by large SAD value calculated during motion estimation for the block) therefore also are not selected. Third, the motion estimation for blocks with low original variance may not be reliable, so the motion vectors for such blocks also are not selected. In alternative implementations, the processing 900 can base the selection of the set of motion vectors on fewer or additional criteria of reliability.

In action 930, the motion vector processing 900 calculates an estimate of the global motion transform of each frame based on the motion vectors selected in action 920. In one example implementation, the global motion transform is estimated using equation (1) for the similarity global motion model discussed above. Alternatively, the global motion transform can be estimated based on another motion model. For estimating the global motion transform, the motion vector processing 900 uses a Random Sample Consensus (RANSAC) method to detect and eliminate motion vectors that are outliers. More particularly, in the RANSAC method, two motion vectors are chosen at random out of the set of motion vectors selected in action 920. The motion vector processing then solves equation (1) using Least Mean Square Error (LMSE) fit to determine values of s, $\beta$, $t_x$, $t_y$ parameters for the two randomly selected motion vectors. The RANSAC method then determines a number of the other motion vectors that also are consistent with this solution of the global motion transform equation parameters with a given fitting threshold. The RANSAC method repeats the random selection of other pairs of motion vectors until a largest group of motion vectors consistent with the solution is found. This eliminates motion vectors that are considered outliers, or inconsistent with the consensus LMSE solution for the parameters of the global motion transform.

In action 940-944, the motion vector processing performs error detection and correction by subjecting the estimate of the parameters for global motion transform to two limits for each of zoom, rotation and translation motion. In the flow diagram, the two limits are denoted as a lower limit ($T_{1x}$) and a higher limit ($T_{2x}$), where $T_{1x} < T_{2x}$ and x represents zoom, rotation or translation. The two limits may be empirically derived through experimentation on a representative large sample of videos that exhibit jittery video motion, and represent a statistical probability as being global motion representative of jittery video motion. As shown in the actions 940-944, if the global motion transform parameters (s, β, $t_x$, $t_y$) are less than their lower limit, the global motion transform as estimated in action 930 is used. Otherwise, if the global motion transform parameters for zoom, rotation and translation exceed the lower limit, but remain less than an upper limit, then the motion vector processing limits the global motion transform to the lower limit as shown at action 943. If the global motion transform estimated at action 930 exceeds the upper limit, then the global motion transform is reset. These actions are thus intended to detect excessive global motion that would not be characteristic of jittery video motion from a shaky hand, and then correct from over-compensation.

A last action 950 of the motion vector processing 900 applies temporal smoothing to the global motion transform. In one example implementation, the global motion transform estimates for a sequence of video frames of a scene are filtered by a 31-tap Gaussian filter (i.e., a filter having a future tap count of 15 and a past tap count of 15) as shown in the following equation (2).

$$W_t' = C_{t-15} \times (W_{t-1} W_{t-2} \ldots W_{t-15})^{-1} + C_{t-14} \times (W_{t-1} W_{t-2} \ldots W_{t-14})^{-1} + \ldots + C_t \times I + \ldots + C_{t+14} (W_{t+1} W_{t+2} \ldots W_{t+14}) + C_{t+15}(W_{t+1} W_{t+2} \ldots W_{t+15})$$  (2).

FIG. 11(*a*) illustrates an exemplary 31-tap Gaussian filter. The notation $(W_{t-1} W_{t-2} \ldots W_{t-15})^{-1}$ denotes matrix inversion. In this equation (2), $W_t'$ is the global motion transform after smoothing at time t, and $W_{t-i}$ is the global motion transform before smoothing at time (t−i). The values $C_{t-i}$ are the Gaussian filter coefficients, and I is the identity matrix. In real time video playback or transcoding scenarios, this size of filter imposes a delay of 15 pictures. Alternative implementations can use a longer or shorter filter size, and alternatively can use other type filter including an adaptive filter.

Two-Pass Motion Vector Processing in Off Line Mode

Figure 10:
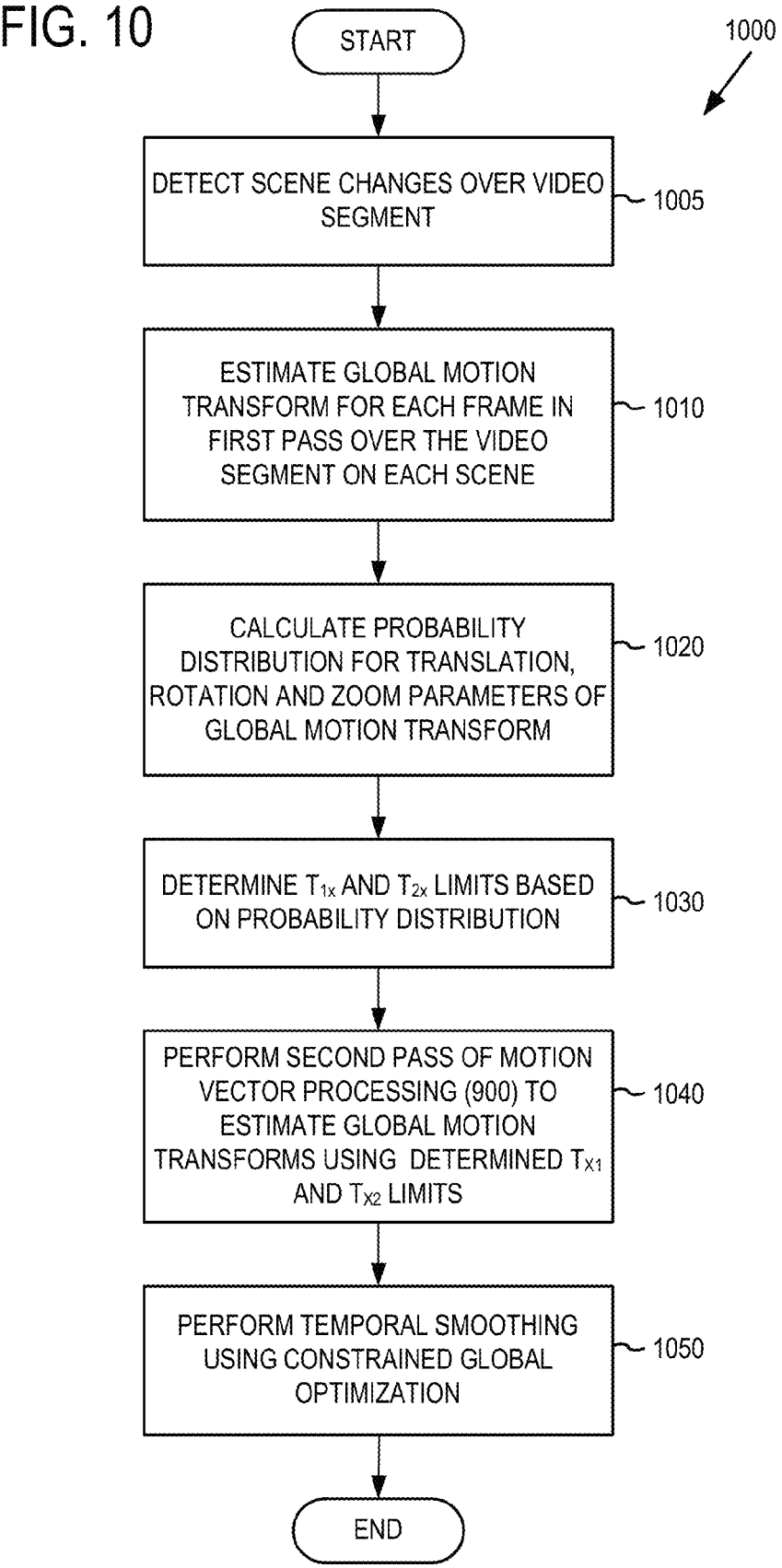
FIG. 10 is a flow diagram illustrating an exemplary two-pass processing of motion vectors for a video frame to estimate a global motion transform of jitter motion due to hand shakiness or other causes, such as for use in an off-line mode digital video image stabilization.

The estimation of the global motion transform can alternatively be done using a two-pass motion vector processing (such as an example two-pass motion vector processing 1000 shown in FIG. 10), which offers better quality of video image stabilization but at a cost of a much increased computation time. Two-pass processing also generally imposes less convenience on the user, because the user is forced to wait until the end of the video stabilization processing to view the results. Due to its increased computational load, the two-pass motion vector processing typically is better suited to run as an off-line mode. The two-pass arrangement of the motion vector processing permits better optimization of the error detection/correction part and the temporal smoothing part of the motion vector processing. In a first pass, the motion vector processing can gather additional information for use in these parts of the processing, which can then be applied in a second motion vector processing pass.

As illustrated at action 1005 in FIG. 10, the two-pass motion vector processing 1000 performs scene change detection over the video segment during a first pass. The scene change detection can be performed using conventionally known methods. Then, in action 1010, the two-pass motion vector processing 1000 produces estimates of the global motion transform for each video frame of the scene for the first pass, such as by applying the same actions as in actions 910, 920 and 930 of the single-pass motion vector processing 900 of FIG. 9. In this first pass, these estimates of the global motion transform are merely gathered to produce statistical information to better optimize global motion transform estimates in a second pass. Accordingly, the global motion estimates in the first pass are not directly used in the image warping 230 of the video image stabilization process 200 to compensate jittery video motion. Instead, at action 1020, the two-pass motion vector processing 1000 calculates minimum and maximum values, and probability distributions for the translation, rotation and zoom parameters of the global motion transform (e.g., $s_{min}$, $s_{max}$, $β_{min}$, $β_{max}$, $t_{xmin}$, $t_{xmax}$, $t_{ymin}$, $t_{ymax}$, p(s), p(β), p($t_x$), and p($t_y$)) across all frames on each scene of the video segment. Alternatively, the probability statistics could be gathered for the video segment as a whole, and not per individual scene.

Based on these empirical probability distributions of the parameters for each scene, the two-pass motion vector processing 1000 at action 1030 determines the lower and upper limits ($T_{1x}$ and $T_{2x}$) in each scene for each of the global motion transform parameters (s, β, $t_x$, $t_y$). For example, the lower and upper limits can be chosen to correspond to certain probability thresholds $p_1$ and $p_2$. In one example, the probability thresholds $p_1$ and p2 are 95% and 98%, respectively. In other words, 95% of the values of the parameter observed in the first pass for the scene are within the limit $T_{1x}$; and 98% of the observed parameter values are under the upper limit $T_{2x}$. In alternative implementations, the two-pass motion vector processing can determine the limits based on other probability thresholds or on some other empirical probability-based criteria. In addition, the lower and upper limits could be bounded by hard limits. As compared to the single-pass motion vector processing 900 in FIG. 9, this setting of the parameter limits ($T_{1x}$ and $T_{2x}$) based on empirical probability statistics of the video permits the error correction and detection applied to the global motion transform to be adaptive to the particular content of the video.

At action 1030, the two-pass motion vector processing 1000 then performs a second pass of the motion vector processing. For this second pass, the processing 1000 can include processing as done in actions 910, 920, 930 and 940-944 of the single-pass motion vector processing 900. For the limits ($T_{1x}$ and $T_{2x}$) applied in actions 940-944 of this second pass, the two-pass process uses the limits determined based on the probability statistics of the video that were gathered in the first pass. Because these limits are adapted to the content of the subject video, the two-pass motion vector processing 1000 should perform better quality error detection and correction using these adaptive limits.

The two-pass motion vector processing also can achieve better quality digital video image stabilization (compared to the single-pass motion vector processing) by also performing the temporal smoothing globally over the video segment. In one example implementation of the two-pass motion vector processing 1000, the processing performs temporal smoothing using a constrained global optimization, instead of the sliding window approach of the single-pass motion vector processing. One example of such constrained global optimization includes determining a constraint for over-smoothed global motion transforms from averaging the global motion transforms for a number N of video frames as an upper limit for temporal smoothing, where N can be a value in the range [10, 15] for over-smoothing. A convex optimization is then performed under the over-smoothing constraint. For example, one target function could be specified as, $$T = \mathrm{argmin}_{W_j}(\Sigma_{j=0}^{M}\Sigma_{i=j-N}^{j+N}C_i \times D(W_j, W_{oi}) + \rho(\Sigma_{j=0}^{M}D(W_j, W_{si}))) \quad (3)$$

In the target function equation (3), the first term means the final smooth transform $W_j$ should be similar to original transform and its neighbor transforms, $W_{oi}$, with different weighting coefficients $C_i$ in a window. The second term means final smooth transform $W_j$ should be similar to the over-smoothed $W_{si}$ as a constraint with weighting $\rho$. The value D is a distance measurement metric, which could be the distance between the transformed coordinates of the four image corners with $W_j$ and $W_{oi}$. Convex optimization could apply to minimize the target function.

Image Warping with Global Motion Transform

With reference again to FIG. 2, the digital video image stabilization process 200 finally performs image warping 230 based on the global motion transforms produced using either the single or two-pass motion vector processing 220. The image warping may be done in the GPU simply by using the GPU D3D APIs and/or a customized bi-cubic vertex shader to apply an image warping in an opposite direction from the estimate of global motion transform due to jittery video motion. In order to provide enough video content at the boundaries of the video frame to permit image warping, the video frame is cropped in one example implementation by about τ% at the boundaries, which could typically be 10% with the one-pass processing mode and a variable (adaptive) percent for different scenes in the two-pass processing mode. This allows a display port to be moved within the content of the video frame by the image warping, which then forms the image-stabilized video for output.

As can be understood from action 944 in the motion vector processing, when the global motion exceeds the amount of jittery video motion that could be due simply to a shaky hand, the global motion transform is simply reset. In this way, no image warping is applied for global video motion that exceeds the limits characteristic of jitter from hand shakiness. The video frame is instead played with its actual motion, without any compensation for hand shakiness.

Video Stabilization Having Low Latency and Memory Usage

In some applications, the latency and memory usage in video stabilization can be reduced by reducing the number of future and past taps in the filter used for temporal smoothing. Using information from fewer future frames reduces latency as less time is needed for a device to accumulate the information needed for smoothing, and memory usage is reduced as fewer video frames need to be stored.

Figure 11A:
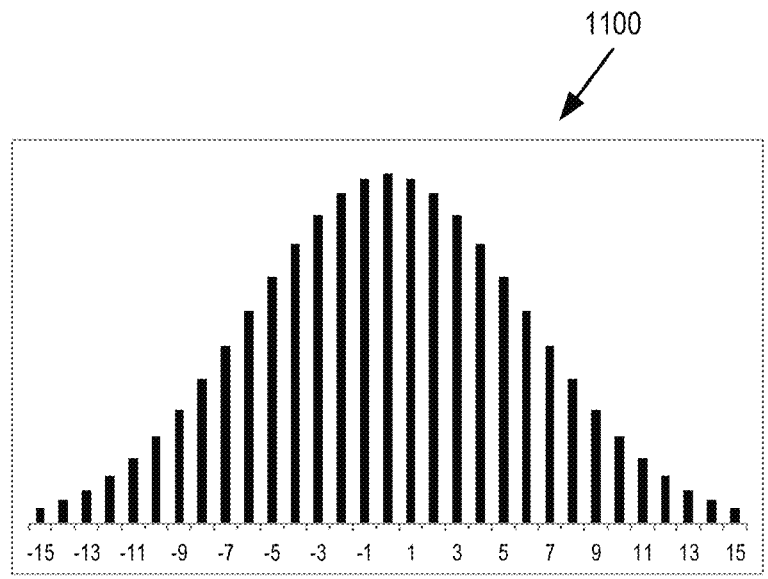
FIGS. 11(a) and 11(b) are exemplary filters for use in temporally smoothing of global motion transforms of jitter motion.
Figure 11B:
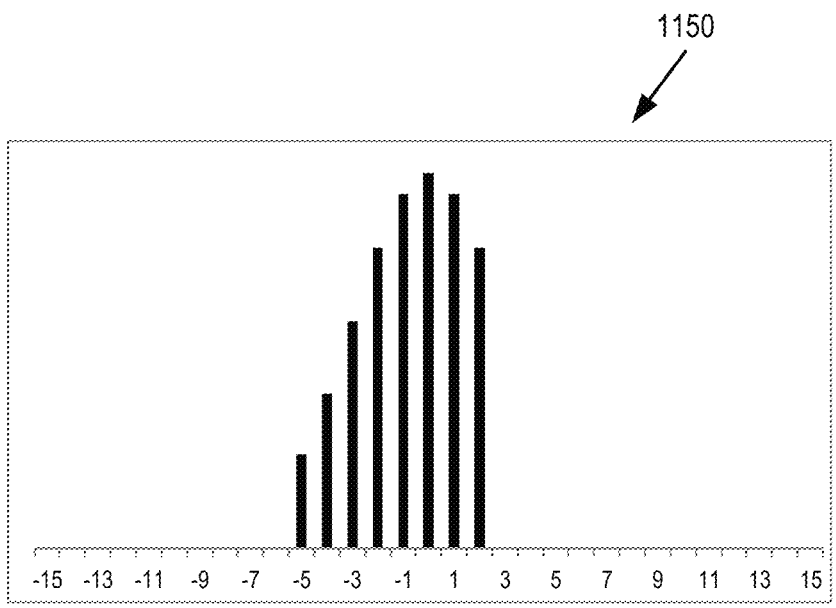

FIGS. 11(a) and 11(b) illustrate exemplary filters that can be used for the temporal smoothing global motion transforms. FIG. 11(a) illustrates a symmetric 31-tap Gaussian filter 1100 that uses information from 15 past frames, the current frame and 15 future frames for temporal smoothing. FIG. 11(b) illustrates a truncated Gaussian filter 1150 (i.e., a truncated version of the Gaussian filter 1100) that provides a lower latency and memory usage vector processing solution relative to the one employing filter 1100. The truncated filter 1150 is truncated in the sense that it contains fewer taps relative to filter 1100. The truncated filter 1150 is an 8-tap filter that uses information from the past five frames, the current frame and two future frames to perform the temporal smoothing. Although filters 1100 and 1150 are Gaussian in nature, temporal smoothing of global motion transforms can employ other types of filters such as other smooth filters or adaptive filters. In addition, smoothing filters can have any number of future taps and any number of past taps. The number of future and past taps in a smoothing filter can be the same, such as in filter 1100, or different, such as in filter 1150.

Figure 12:
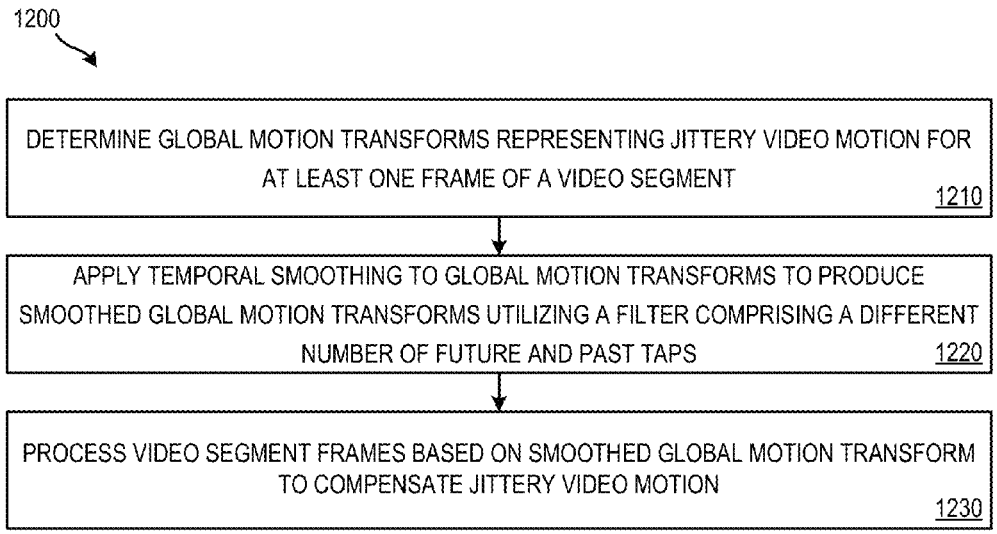
FIG. 12 is a flow diagram illustrating an exemplary video image processing of global motion transforms using a filter having a different number of future tap counts and past tap counts.

FIG. 12 is a flow diagram illustrating an exemplary video image processing of global motion transforms using a filter having a different number of future and past tap counts. The method 1200 can be performed, for example, by a cloud-based service that has received a video segment recorded by and uploaded from a smartphone. The video segment contains jittery motion due to hand shakiness or other causes.

At 1210, global motion transforms representing jittery video motion are determined for at least one frame of a plurality of frames of a video segment. In some embodiments, local motion vectors of each frame of the plurality of frames of the video segment are processed to produce the global motion transforms. The local motion vectors can indicate local motion for a plurality of blocks of said each frame relative to a reference frame of said each frame. In the example, the cloud-based service processes local motion vectors for 50 frames in the video segment to produce a global motion transform for each of the 50 frames. The local motion vectors associated with each frame indicate local motion for a plurality of blocks in each frame relative to the preceding frame. That is, the reference frame for each of the 50 frames is the immediately preceding frame. Or, the reference frame can instead be another (more temporally remote) frame. Alternatively, the global motion transforms are produced in some other way (e.g., directly from analysis of the sample value of frames, received from another device that has analyzed the video and/or its motion, etc.)

At 1220, temporal smoothing is applied to the at least one global motion transform to produce at least one smoothed global motion transform. The temporal smoothing utilizes a filter comprising a number of future taps and a number of past taps, the number of future taps being different from the number of past taps. In one example, a filter having 2 future taps corresponding to the two immediately following frames and 4 past taps corresponding to the four immediately preceding frames is used to temporally smooth the global motion transforms to generate a smoothed global motions vector for each of the 50 frames. That is, the smoothed global motion transform for each frame is based on the global motion transform for the current frame, four preceding frames and two future frames.

At 1230, the at least one of the frames of the video segment are processed based on the at least one smoothed global motion transform to compensate for the jittery video motion. In the example, the 50 frames of the video segment are processed based on the smoothed global motion transforms for the 50 frames to compensate for the jittery video motion.

In some embodiments the method 1200, can further comprise displaying the processed frames on a display. In the example, the processed 50 frames of the video segment are displayed on a displayed of a computing device. Alternatively, the processed frames are output for streaming or other transmission, output for subsequent processing such as encoding at the same device or a different device, output to local or remote storage, or output in some other way.

The number of future taps in a truncated filter to be used for temporal smoothing of global motion transforms can be determined experimentally. For example, a baseline filter is applied to global motion transforms for a video segment to determine a set of baseline smoothed global motion transforms. This set of baseline transforms is then compared to a plurality of smoothed global motion transform sets generated by applying a plurality of truncated filters (i.e., filters with fewer future taps than the baseline filter) to the global motion transforms. The test result data generated by application of the baseline filter and the truncated filters to the global motion transforms indicates a tradeoff between video stabilization quality and future tap count and is examined to determine a truncated filter future tap count to be used in smoothing filters in motion vector processing.

A similar approach can be used to determine the number of past taps in a truncated filter. The baseline filter has a fixed future tap count that is set to the truncated filter future tap count, and the baseline smoothed global motion transforms are compared to a plurality of smoothed global motion transforms generated by applying a plurality of truncated filters that vary in the number of past taps to the global motion transforms.

Figure 13:
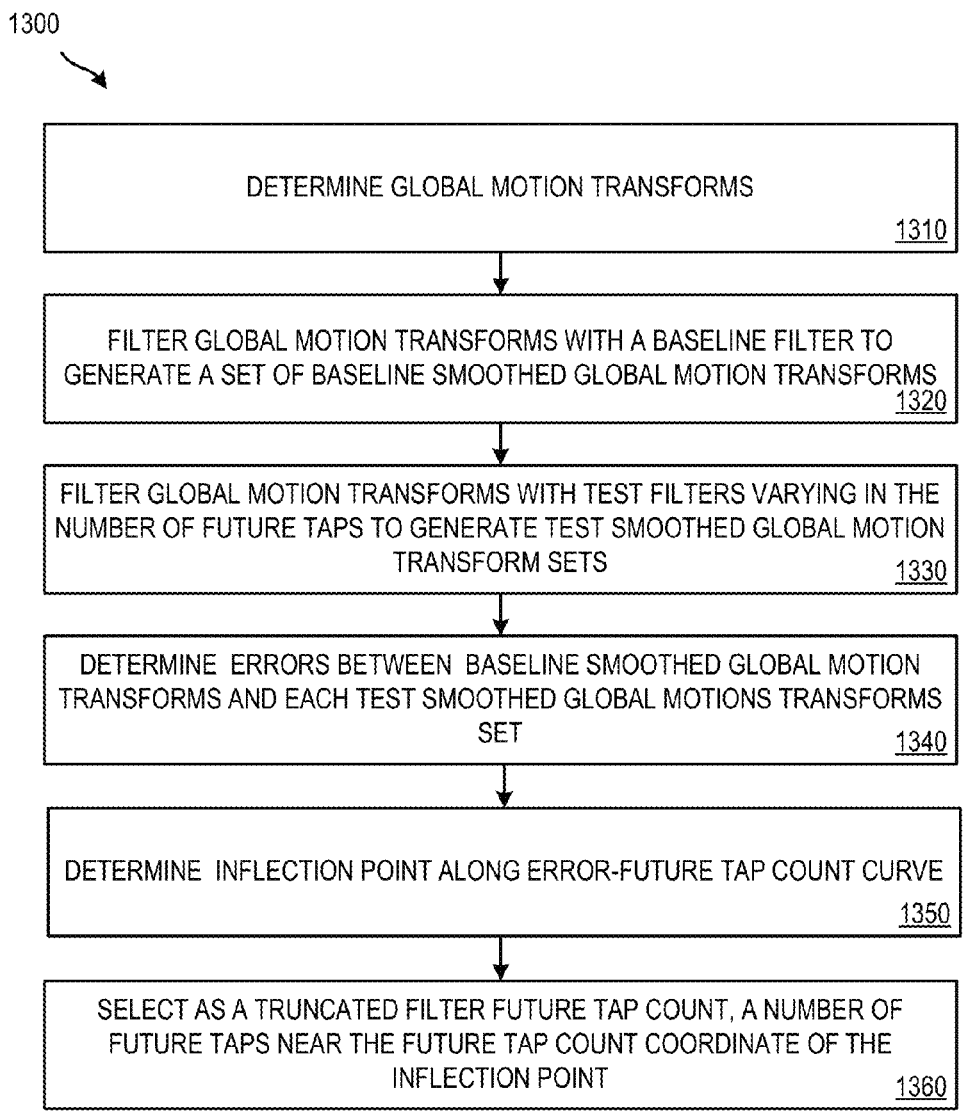
FIG. 13 is a flow diagram illustrating an exemplary determination of the number of future taps in a truncated filter for use in temporal smoothing of global motion transforms.

FIG. 13 is a flow diagram illustrating an exemplary method 1300 of determining the number of future taps in a truncated filter for use in temporal smoothing of global motion transforms. The method 1300 can be performed by, for example, a handheld video camcorder on a video segment of a soccer game containing both local motion (e.g., individual players running) and global motion (e.g., jitter due to hand shakiness). At 1310, global motion transforms for a plurality of frames in a video segment are determined as described herein. In the example, the camcorder determines global motion transforms for 130 frames (frames 1 through 130) in the soccer game video segment.

At 1320, the global motion transforms are filtered with a baseline filter to generate a set of baseline smoothed global motion transforms. The baseline filter comprises n future taps. The baseline filter can be, for example, the 31-tap Gaussian filter illustrated in FIG. 11(a) (n=15) or any other filter. Typically, the baseline filter has an equal number of future and past taps and uses information from a sufficient number of future and past frames such that adding additional taps to the baseline filter provides little or no improvement to video stabilization quality. The frames in the video segment for which global motion transforms are determined have a sufficient number of preceding and following frames to allow the temporal smoothing filter to be applied. Thus, for a baseline filter having n future taps and n past taps, global motion transforms can be determined for frames in the video segment having at least n future frames and n past frames. In the example, the camcorder filters the global motion transforms of the soccer video segment with a 31-tap Gaussian filter (n=15) comprising 15 past taps and 15 future taps to generate a set of baseline smoothed global motion transforms for frames 16 through 115 of the video segment, frame 16 being the first frame having global motion transforms for 15 preceding frames, and frame 115 being the last frame having global motion transforms estimated for 15 following frames. Alternatively, a shorter filter is used for frames at the beginning or end of the segment, as appropriate.

At 1330, the global motion transforms are filtered with a plurality of test filters to generate a plurality of test smoothed global motion transform sets. Each of the test filters has any of zero through m future taps, wherein 0<m<n. The test filters typically also have the same number of past taps as the baseline filter. The test filters can have the same filter coefficients as the baseline filter at the corresponding tap locations. In some embodiments, test filters have future tap counts that range from 1 through n−1. In the example, the global motion transforms for the soccer video segment are filtered with 14 test filters having 14 past taps and ranging in future tap count from 1 through 14 future taps to generate 14 sets of test smoothed global motion transforms. In the example, each test smoothed global motion transform set comprises transforms for the same set of frames for which the baseline smoothed global motions transforms were determined, frames 16 through 115.

Next, a future tap count for the truncated filter is determined. Typically, the future tap count is determined based at least in part on the set of baseline smoothed global motion transforms and the plurality of test smoothed global motion transform sets. For example, the future tap count is determined as shown in stages 1340, 1350 and 1360 of FIG. 13. Alternatively, the future tap count is determined in another way (e.g., future tap count value closest to a user-selected, application-selected, or device-selected quality level for video stabilization).

At 1340, an error between the set of baseline smoothed global motion transforms and each of the test smoothed global motions transforms sets is calculated. In some embodiments, where the global motion transforms are in the form of a similarity transform, the error (or difference) can be a normalized error calculated using the following equation:

$$\sum_{i=0}^{f} \frac{\sqrt{(s_{i,n} - s_{i,X})^2 + (\beta_{i,n} - \beta_{i,X})^2 + (t_{x,i,n} - t_{x,i,X})^2 + (t_{y,i,n} - t_{y,i,X})^2}}{\sqrt{s_{i,n}^2 + \beta_{i,n}^2 + t_{x,i,n}^2 + t_{y,i,n}^2}} \quad (4)$$

$$(f)$$

where $s_{i,X}$, $\beta_{i,X}$ and $t_{x,i,X}$, $t_{y,i,X}$ are the zoom, rotation and translation similarity transform model parameters for frame i with X future taps, and f is the total number of frames in the video segment for which global motion transforms have been estimated. Approaches other than the approach illustrated in Equation 4 can be used in determining the error. In the example, the baseline and test smoothed global motions transforms are in the form of a similarity transform model, and Equation 4 is used to calculate the error between the baseline smoothed global motion transform set and each of the 14 test smoothed global motion transform sets.

Figure 14:
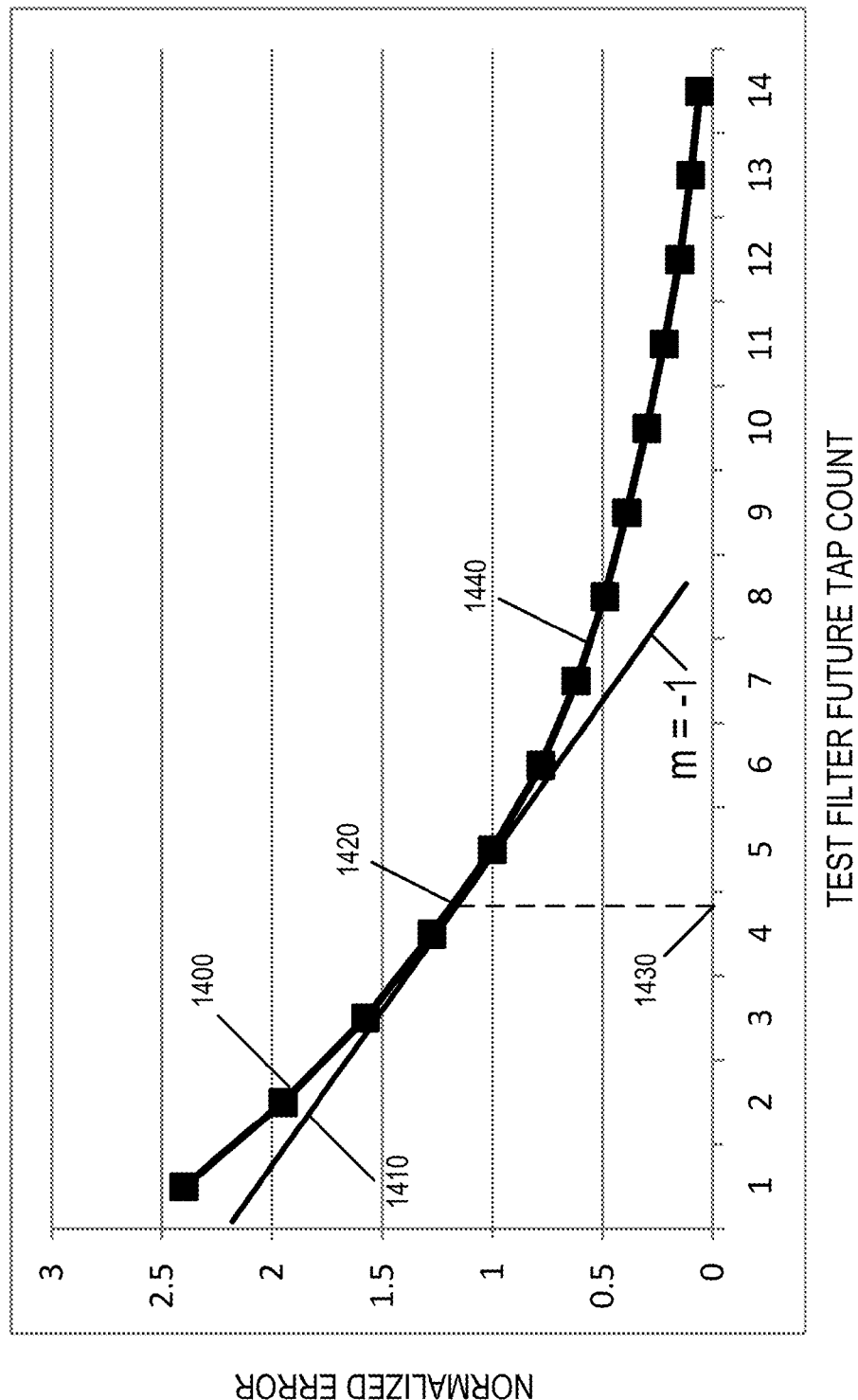
FIG. 14 is a graph comprising an exemplary error-future tap count curve for a single video segment for use in determining a truncated filter future tap count.

At 1350, an inflection point along an error-future tap count curve based on the determined errors and the number of future taps in the test filters (where the slope of the tangent to the curve is approximately −1 in FIG. 14) is determined. The error-future tap count curve indicates the tradeoff between video stabilization quality and the number of future taps in a filter used for temporal smoothing. Although the term inflection point is typically understood to refer to a point along a curve where the curvature of the curve changes sign, the term inflection point is used herein, for convenience, to refer to a point along an error-tap count curve where the tangent to the curve (i.e., tangent 1410) has a slope of approximately −1 in FIG. 14. An inflection point indicates a point along the curve near the point at which using smoothing filters with successively higher future tap counts results in successively less improvements in video stabilization quality (i.e., the point along the curve at which the tangent to the curve has a slope of −1). FIG. 14 shows an exemplary error-future tap count curve 1400 illustrating the tradeoff in error versus the number of future taps in the test filters. In the example, the inflection point can be point 1420, the point at which the tangent to curve 1400 has a slope of −1, or any point along the curve close to 1420 where the slope of the tangent is approximately −1.

At 1360, a number of future taps near the inflection point is selected as a truncated filter future tap count. In the example, a future tap count of 4 is selected as the truncated filter future tap count, as this is the integer test filter future tap count nearest the future tap count coordinate 1430 of the inflection point (which is an X-axis coordinate in FIG. 14). In some embodiments, the truncated filter future tap count can be the next future tap count coordinate of the inflection point rounded up to the next integer future tap count.

Typically, actions 1310, 1320, 1330 and 1340 are performed for multiple video segments, and the error used in generating the error-future tap count curve is an average (or median or other calculation) of the error calculated for each video segment. The multiple video segments can cover a variety of local and global motion scenarios. Alternatively, in some embodiments, the truncated filter future tap count can be determined using one video segment. The truncated filter future tap count can be determined by video capture device developers during product design or during manufacture, or determined on the fly by a mobile device during operation. For example, the video capture device can determine a truncated filter future tap count based on an early portion of a video segment being actively captured by the mobile device.

Or, the video capture device can adjust (or initially determine) the truncated filter future tap count based on user input, an application setting, or a device setting that sets a tradeoff between video stabilization quality versus memory usage and latency. For example, a user, application, or device setting for video stabilization quality can be translated to a number of future taps for a smoothing filter, based on a mapping of stabilization quality to future tap counts for video being processed (on the fly) or video expected to be processed for the user, application or device. A video stabilization quality setting can be exposed or set in a variety of ways. In one example, a user can adjust a video stabilization quality setting via operating a touchscreen slide bar that can be moved between "less stabilization" and "more stabilization," the slide bar position being mapped to a truncated future filter tap count. In another example, an application can determine the number of future taps based on the type of application. For instance, an application enabling real-time communication, such as a videophone application, can set a video stability setting to "low," which is mapped to a lower future tap count to reduce latency. In yet another example, if the device includes video stabilization hardware that can be enabled or disabled, the device can set the number of future taps based on whether the video stabilization hardware is enabled or disabled. In this way, the device determines the quality versus memory usage/latency, uses the setting to determine or adjust the truncated filter, and applies the truncated filter in video stabilization.

Figure 15:
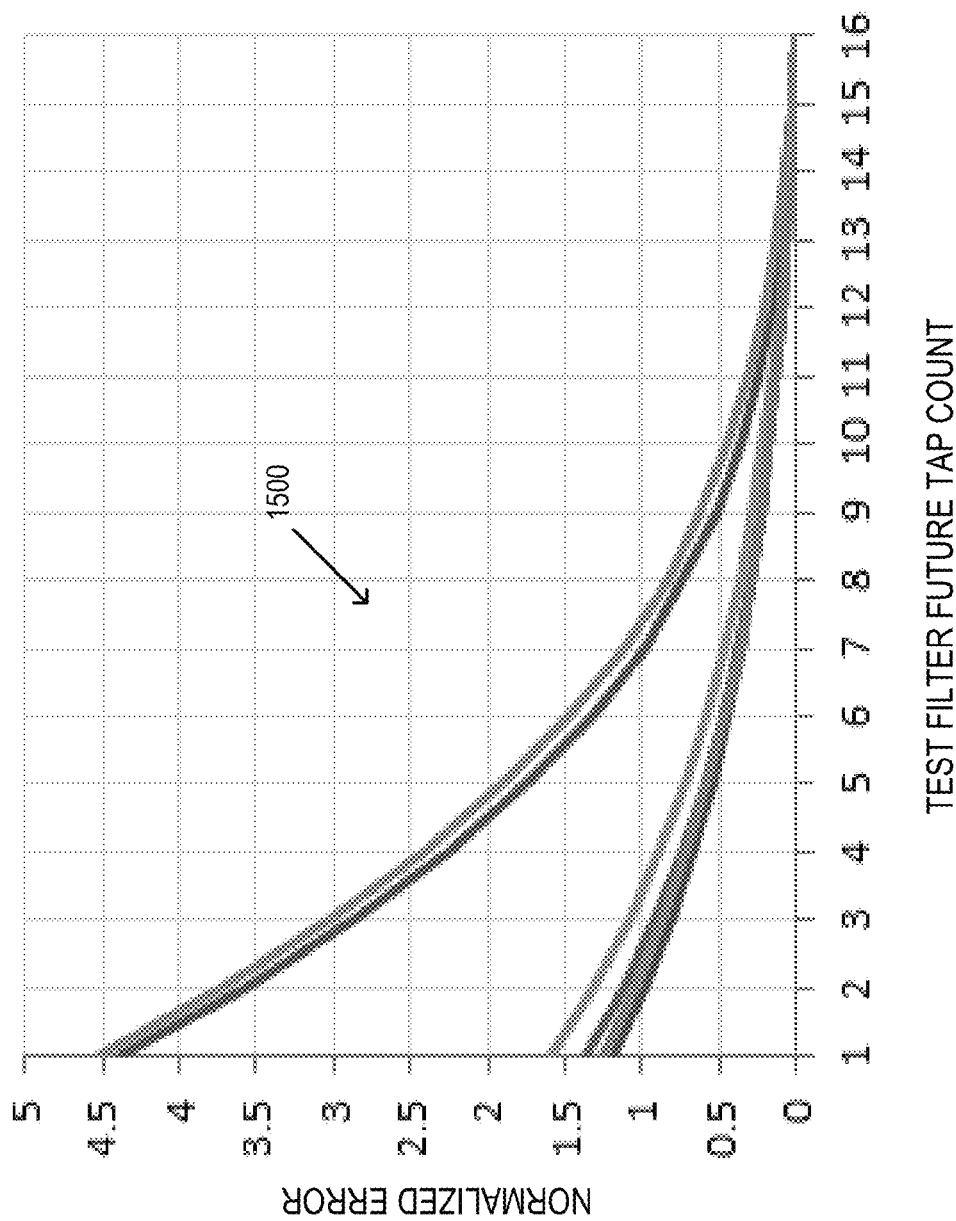
FIG. 15 is a graph comprising exemplary error-future tap count curves for multiple video segments for use in determining a truncated filter future tap count.

FIG. 15 shows a family of error-future tap count curves 1500 for a plurality of video segments. In some embodiments, the truncated filter future tap count can be determined by determining the average or median of the integer test filter tap count nearest the future tap count coordinates of the inflection point of each error-tap count curve. The truncated filter future tap count can be determined from a family of error-tap count curves in various additional manners. For example, the test filter future tap count nearest the future tap count coordinate of each curve's inflection point can be weighted. In this way, video segments representing local and global motion types or patterns that are more frequently encountered during typical device usage can be more heavily weighted than video segments representing local and global motions that are less frequently encountered. In another example, the truncated filter tap count can be the maximum (or minimum) of the integer test filter future tap counts nearest the future tap count coordinate of the inflection point of each error-future tap count curve.

In some embodiments, the method 1300 can further comprise temporally smoothing the global motion transforms of a video segment with a truncated filter having a number of future taps equal to the truncated future tap count, processing the video segment based on the smoothed global motion transform to compensate for jittery motion, and playing the compensated video segment to a user on a display of a computing device (or otherwise outputting the compensated video segment).

The method 1300 can further comprise temporally smoothing a video segment with one or more truncated filters having a future tap count different from the truncated filter future tap count, processing the video segment based on the resulting smoothed global motion transforms and playing (or otherwise outputting) the additional versions of the video segment. A user (e.g., end user of the capture device, end user of stabilization software apart from the capture device, device designer, etc.) can then determine if any additional loss in video stabilization quality due to reducing the future tap count below the truncated filter future tap count is acceptable, or alternatively determine if more delay would be acceptable by increasing the future tap count above the truncated filter future tap count to improve the video stabilization quality. Thus, latency and memory usage can be further reduced if a user considers the video stabilization quality achieved using filters with future tap counts less than the truncated future tap determined by method 1300 (or similar methods) to be acceptable. The method 1300 can further comprise receiving from a user a modified truncated future tap count. In one embodiment, the method 1300 determines a truncated filter tap count of 4, but is reduced to 2 or 3 based on a user determining that reducing the future tap count yields acceptable video stabilization quality.

A number of past taps to be used in a truncated filter for temporal smoothing can be determined using a similar method. The global motion transforms for a video segment can be filtered with a baseline filter having a number of future taps equal to a truncated filter future tap count determined using method 1300 or a similar method. The global motion transforms are then filtered by a set of test filters that vary in the number of past taps to generate test smoothed global motion transform sets. The error between the baseline smoothed global motion transforms and each of the test smoothed global motion transform sets is determined, and the test filter generating the smoothed global motion transform set having the smallest amount of error is identified. The truncated filter past tap count is the number of past taps in the test filter having the smallest error.

Figure 16:
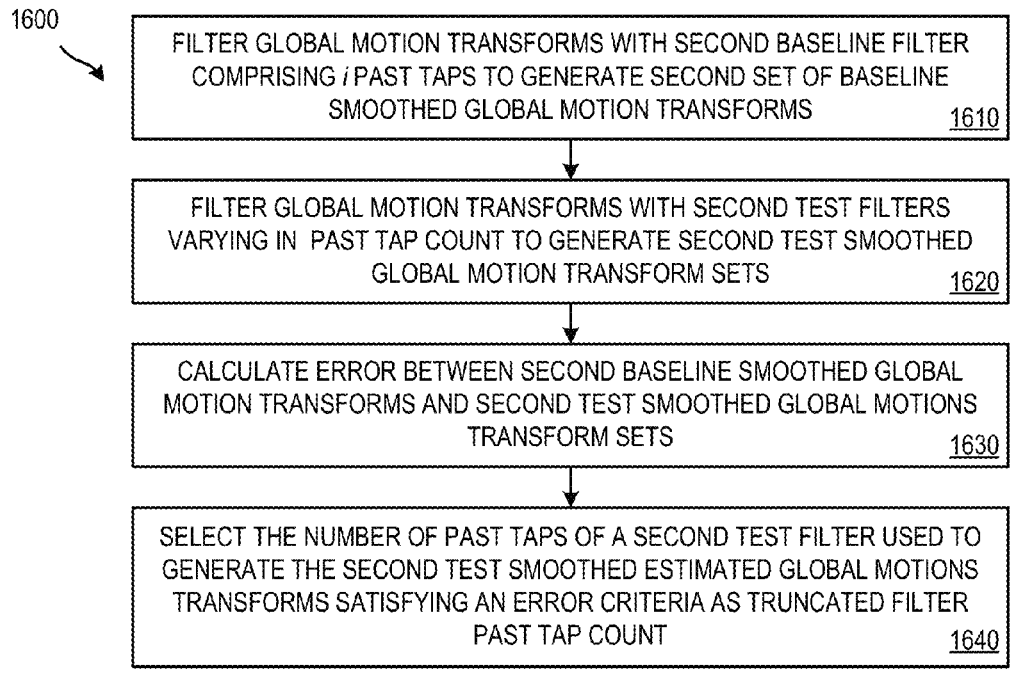
FIG. 16 is a flow diagram illustrating exemplary determination of a truncated filter past tap count for use in temporal smoothing of global motion transforms.

FIG. 16 is a flow diagram of additional actions that can performed by the method 1300 to determine a number of past taps in a truncated filter to be used for temporally smoothing global motion transform estimates. At 1610, the global motion transforms are filtered with a second baseline filter to generate a set of second baseline smoothed global motion transforms. The second baseline filter comprises i past taps and a number of future taps equal to the truncated filter future tap count. Continuing the example of the camcorder operating on a video segment of a soccer game, the global motion transforms for frames 16 through 115 of the video segment are filtered with a second baseline filter having 4 future taps (the number of future taps nearest to the future tap count coordinate of the inflection point 1420 in FIG. 14) and 15 past taps (i=15) to create a set of second baseline smoothed global motion transforms.

At 1620, the global motion transforms are filtered with a plurality of second test filters to generate a plurality of second test smoothed global motion transform sets. Each of the test filters has any of zero through j past taps, wherein 0<j<i. In the example, the global motion transforms for the soccer game video segment are filtered with 14 second test filters having 4 future taps and 1 through 14 (j=14) past taps, respectively, to generate 14 sets of second test smoothed global motion transforms. Each second test smoothed global motion transform set comprises transforms for frames 16 through 115 of the soccer video segment.

Next, a past tap count for the truncated filter is determined. Typically, the past tap count is determining based at least in part on the set of second baseline smoothed global motion transforms and the plurality of second test smoothed global motion transform sets. For example, the past tap count is determined as shown in stages 1630 and 1640 of FIG. 16. Alternatively, the past tap count is determined in another way (e.g., past tap count value closest to a user-selected, application-selected, or device-selected quality level for video stabilization).

At 1630, errors between the set of second baseline smoothed global motion transforms and each of the second test smoothed global motions transform sets are calculated. In the example, errors between the set of second baseline smoothed global motion transforms and each of the 14-second test smoothed global motion transform sets is determined.

At 1640, the number of past taps of a test filter generating a set of second test smoothed global motions transforms satisfying an error criteria is selected as a truncated filter past tap count. In one embodiment, the number of past taps of the second test filter used to generate the second test smoothed global motion transforms having the lowest error from among the plurality of second test smoothed global motion transforms is selected as the truncated filter past tap count. In other embodiments, an inflection point along an error-past tap count curve is determined and a past tap count near the past tap count coordinate of the inflection point is selected as the truncated filter past tap count.

Thus, in the example, truncated filters having a future tap count of four and a past tap count of four provide reduced latency and memory usage in exchange for a reduction in video stabilization quality. In another embodiment, where a user indicates that a truncated filter future tap count of 2 provides acceptable video stabilization, a 7-tap filter with 2 future taps and 4 past taps is used for temporal smoothing. In some embodiments, the truncated filter future tap count is greater than or equal to 2 and less than or equal to 4 and the truncated filter past tap count is greater than or equal to 4 and less than or equal to 8.

In some embodiments, the method 1300 determines a truncated filter past tap count in a manner other than performing method 1600 or similar methods. For example, the truncated filter future tap count can be scaled by a factor to determine the truncated filter past tap count. In one such example, the truncated future tap count can be scaled by a factor of two to determine the truncated filter past tap count.

With a truncated filter future tap count and a truncated filter past tap count determined, a computing device can perform motion vector processing on a video segment that includes temporally smoothing global motion transforms for the video segment, processing the video segment to compensate for the jittery motion represented by the smoothed global motion transforms, and play (or otherwise output) the processed video segment at the computing device.

In some embodiments, the taps of a truncated filter align one-to-one with the frames of a video segment. For example, if a video segment used in determining truncated filter tap counts has a frame rate of 60 Hz, meaning the frames of the video segment are approximately 16.7 ms apart, the taps of the baseline and test filters are also spaced approximately 16.7 ms apart.

In some embodiments, a frame rate of a video segment used in determining the truncated filter future tap count and truncated filter past tap count can be associated with the tap counts, and the truncated filter future and past tap counts can be scaled for motion vector processing of video segments having other frame rates. For example, if truncated filter future and past tap counts of 2 and 4, respectively, are determined using a video segment having a 24 Hz frame rate, and an additional video segment to be processed has a frame rate of 60 Hz, the truncated filter future and past tap counts can be scaled up by a factor of 2.5 (60 Hz/24 Hz) to 5 and 10, respectively. The amount of memory used to perform the temporal smoothing increases, as 2.5 times as many past and future frames are stored with the increased tap counts, but there is no corresponding 2.5× increase in the latency. For example, 5 frames at 60 Hz occur over the same period as 2 frames at 24 Hz (~83 milliseconds).

In some embodiments, additional information can be used in determining the truncated filter future and past tap count. For example, latency information can be provided from other components in a video processing pipeline to the hardware or software component(s) performing the motion vector processing. For instance, a motion vector processing component can determine that adding latency to motion vector processing is tolerable based on the received latency information, and the truncated filter future tap count can be determined by, for example, selecting a future tap count corresponding to a point to the right of the inflection point of an error-future tap count curve (e.g., a point 1440 in FIG. 14). The latency information received by the motion vector processing component can be in the form of an additional amount of latency that motion vector processing component can consume, the amount of latency that a downstream component consumes, which can be applied against an overall video processing latency budget, and the like.

In some embodiments, input from an accelerometer, gyroscope or other sensor in a video capture device can be used in determining the truncated filter future and past tap counts. For example, the video capture device can determine, based on data from an accelerometer or a gyroscope how "shaky" the capture device is in the environment.

In some embodiments, processing of video segments to compensate for jittery motion can be performed by a computing device other than the device used to capture the video. Offloading video processing to account for jittery video can be useful when, for example, the battery life of the video capture device is low or the video capture device lacks dedicated graphics processing hardware. For example, videos captured by a camcorder can be downloaded to a personal computer or laptop computer, or uploaded to a cloud-based service for processing.

In some embodiments, information about the video capture device (video capture device information) used to record a video segment can be stored along with the video segment. The video capture device information can include the truncated filter future and past tap counts, which can be used by the computing device performing the jitter compensation processing. The video capture device information can further include video capture device identifying information such as information identifying the manufacturer of the video capture device, product type, model number, serial number and the like. In some embodiments, the video capture device information includes information identifying a service or computing resource that has access to a video capture device database that stores truncated filter future and past tap counts for various media captured devices. Such a database can be stored locally at, for example, a personal computer that stores video capture device information for video capture devices used by a household, or remotely at, for example, a cloud-based service that hosts a video capture device information database or at a server operated by a video capture device manufacturer. The computing device can access the centrally located database to access the truncated filter future and past tap counts prior to processing a video segment to compensate for jittery motion. Information for locating the central database can be included in the video capture device information.

The video capture device information can also contain information such as whether image stabilization features of the video capture device (which could be implemented either in hardware or software) were enabled when the video was recorded, and the database can have truncated filter tap counts stored for the media video capture device for when image stabilization features are enabled or disabled.

Example Computing Environment

Figure 17:
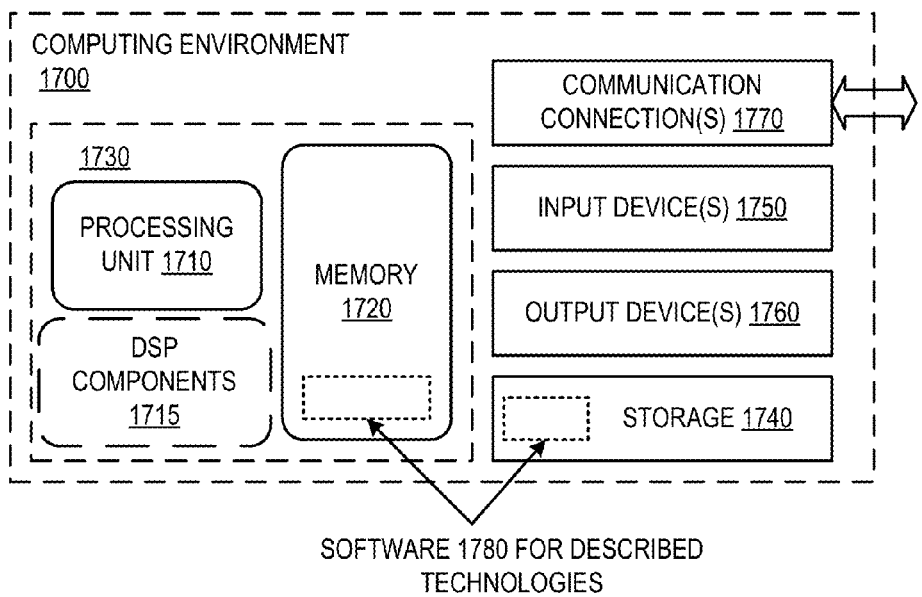
FIG. 17 is a block diagram of a computing environment in which the disclosed digital video image stabilization techniques may be practiced.

FIG. 17 illustrates a generalized example of a suitable computing environment 1700 in which described embodiments, techniques, and technologies may be implemented. For example, the computing environment 1700 can be one of the computing devices (e.g., a computer server, personal computer, laptop or other computing device) on which the digital video image stabilization process 200 of FIG. 2 is run.

The computing environment 1700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 17, the computing environment 1700 includes at least one central processing unit 1710 and memory 1720. In FIG. 17, this most basic configuration 1730 is included within a dashed line. The central processing unit 1710 executes computer-executable instructions and may be a real or a virtual processor. In a multi-processing system, multiple processing units execute computer-executable instructions to increase processing power and as such, multiple processors can be running simultaneously. The memory 1720 may be volatile memory (e.g., registers, cache, RAM), non-volatile memory (e.g., ROM, EEPROM, flash memory, etc.), or some combination of the two. The memory 1720 stores software 1780 that can, for example, implement the technologies described herein.

In addition to the central processing unit 1710, the computing environment can include other processing resources, such as digital signal processing (DSP) or multimedia components 1715. The DSP components 1715 may be any of the resources that can be utilized advantageously for the digital video image stabilization process by the generic platform library implementation discussed above in connection with FIG. 1. For example, the DSP components may include multimedia DSP ASIC units, GPU shader units, multicore CPU, advanced multimedia instruction sets for the CPU, etc.

A computing environment may have additional features. For example, the computing environment 1700 includes storage 1740, one or more input devices 1750, one or more output devices 1760, and one or more communication connections 1770. An interconnection mechanism (not shown) such as a bus, a controller, or a network, interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, CD-RWs, DVDs, or any other medium which can be used to store information and which can be accessed within the computing environment 1700. The storage 1740 stores instructions for the software 1780, which can implement technologies described herein.

The input device(s) 1750 may be a touch input device, such as a keyboard, keypad, mouse, pen, or trackball, a voice input device, a scanning device, or another device, that provides input to the computing environment 1700. For audio, the input device(s) 1750 may be a sound card or similar device that accepts audio input in analog or digital form, or a CD-ROM reader that provides audio samples to the computing environment 1700. The output device(s) 1760 may be a display, printer, speaker, CD-writer, or another device that provides output from the computing environment 1700.

The communication connection(s) 1770 enable communication over a communication medium (e.g., a connecting network) to another computing entity. The communication medium conveys information such as computer-executable instructions, compressed graphics information, or other data in a modulated data signal.

Computer-readable media are any available media from which data and processor instructions can be accessed within a computing environment 1700. By way of example, and not limitation, within the illustrated computing environment 1700, computer-readable media include memory 1720 and/or storage 1740. As should be readily understood, the term computer-readable storage media includes the media for storage of data and program instructions such as memory 1720 and storage 1740, and not modulated data signals alone.

Example Cloud Computing Network Environment

Figure 18:
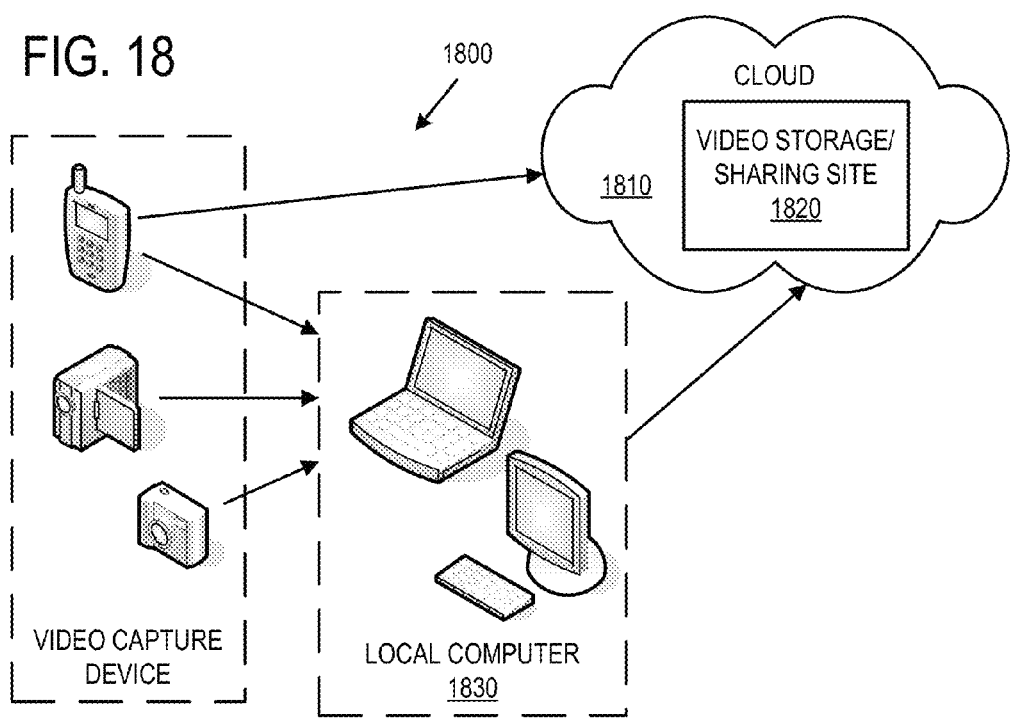
FIGS. 18 and 19 are block diagram of a cloud computing network environment in which the disclosed digital video image stabilization techniques may be practiced.
Figure 19:
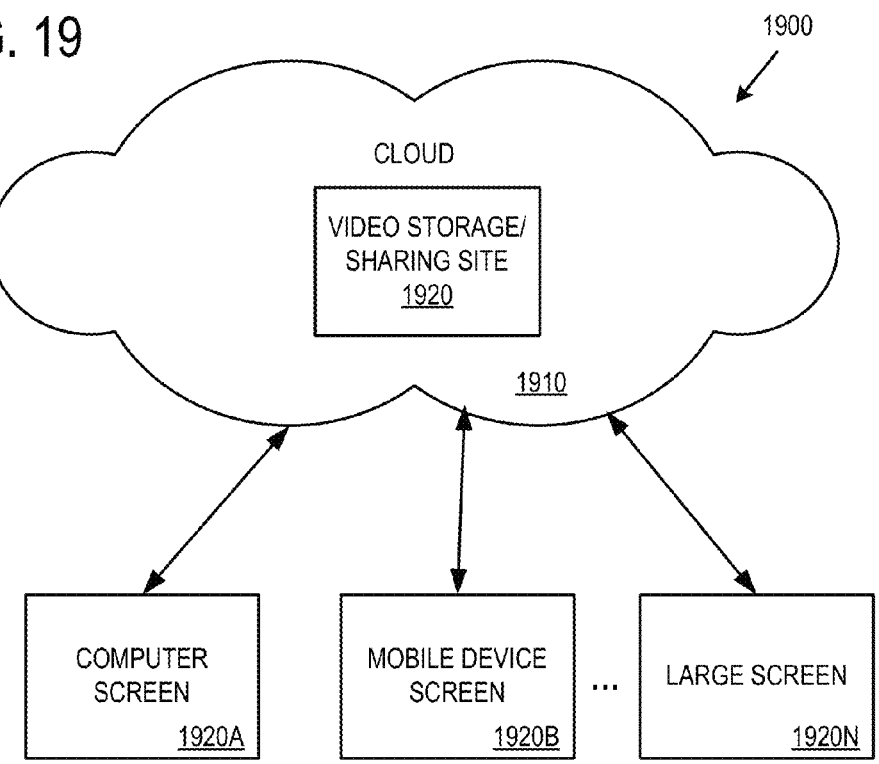

FIGS. 18 and 19 illustrate a generalized example of a suitable networking environment 1800 for cloud computing in which the above described digital video image stabilization may be practiced.

In example cloud computing network environment 1800, various types of computing services for video sharing, storage or distribution (e.g., video sharing or social networking sites) are provided by a collection of network-accessible computing and storage resources, referred to as the cloud 1810. For example, the cloud 1810 can comprise a collection of server computing devices, which may be located centrally or at distributed locations that provide cloud-based services to various types of users and devices connected via a network such as the Internet.

In example environment 1800, the cloud 1810 provides services (such as video storage, video sharing or social networking services, among other examples) for user computing devices. Services can be provided in the cloud 1810 through cloud computing service providers, or through other providers of online services. For example, the cloud-based services can include a video storage service, a video sharing site, a social networking site, or other services via which user-sourced video is distributed for viewing by others on connected devices 1920A-N.

The user may use various mobile video capture devices to record video, such as video camcorders, digital cameras with video mode, mobile phones, and handheld computing devices. The user can upload video to a service on the cloud 1810 either directly (e.g., using a data transmission service of a telecommunications network) or by first transferring the video to a local computer 1830, such as a laptop, personal computer or other network connected computing device.

As shown in FIG. 19, video can be later downloaded, streamed and/or otherwise played back from cloud-based video storage or sharing site to other connected computer devices that may have a variety of screen display size factors 1920A-N. Connected device 1920A represents a device with a mid-size display screen, such as may be available on a personal computer, a laptop, a tablet or other like network connected devices.

Connected device 1920B represents a device with display screen with form factors designed to be highly portable (e.g., a small size screen). For example, connected device 1920B could be a mobile phone, smart phone, personal digital assistant, and the like.

Connected device 1920N represents a connected device with a large viewing screen. For example, connected device 1920N could be a television screen (e.g., a smart television) or another device that provides video output to a television or a video projector (e.g., a set-top box or gaming console), or other devices with like video display output.

In the illustrated cloud-computing network environment 1800, the digital video image stabilization can be implemented and performed at various stages of the video sharing, storage and distribution, and by various of the depicted devices depending on the desired use scenario. In one example scenario, the digital video image stabilization is implemented in software on the local computer 1830, and applied when the video is either initially transferred to the local computer or when uploaded to the cloud-based service. In another scenario, the digital video image stabilization is implemented in the cloud, and applied to video as it is uploaded to and stored in the cloud. In another scenario, the digital video image stabilization is implemented by cloud computing services and applied when the video is played, transferred to or distributed to another connected device or service. In yet another scenario, the digital video image stabilization is implemented by cloud computing services, and applied when trans-coding the video for presentation at suitable resolution or streaming at suitable transmission bandwidth for the connected device on which it is to be viewed. In still other scenarios, the digital video image stabilization can be performed on the connected device at playback.

Example Alternatives and Combinations

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs, volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network) or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while still remaining faithful to the concepts described above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-implemented method of digital video stabilization, the method comprising:
    for at least one frame of a plurality of frames of a video segment, determining at least one global motion transform representing jittery video motion;
    applying temporal smoothing to the at least one global motion transform to produce at least one smoothed global motion transform, the applying temporal smoothing utilizing a filter comprising a number of future taps and a number of past taps, the number of future taps and the number of past taps each being greater than zero, and the number of future taps being less than the number of past taps; and
    processing the at least one of the frames of the video segment based on the at least one smoothed global motion transform to compensate for jittery video motion;
    after the processing based on the at least one smoothed global motion transform, outputting the processed at least one of the frames of the video segment for display or subsequent processing.

2. The method of claim 1, further comprising:
    as part of the determining the at least one global motion transform, processing local motion vectors of each frame of the at least one frame of the plurality of frames of the video segment to produce the at least one global motion transform.

3. The method of claim 1, wherein the at least one global motion transform is based on a similarity model of video motion.

4. The method of claim 1, wherein the filter is a truncated smooth filter.

5. The method of claim 1, wherein the number of future taps is greater than or equal to 2 and less than or equal to 4.

6. The method of claim 1, wherein the number of future taps is determined from test result data indicating a tradeoff between stabilization quality and the number of future taps or past taps in the filter.

7. A computer-implemented method of determining a truncated filter future tap count for use in temporally smoothing global motion transforms representing jittery motion in a video segment, the method comprising:
    determining global motion transforms for a plurality of frames in the video segment;
    filtering the global motion transforms with a baseline filter comprising n future taps to generate a set of baseline smoothed global motion transforms;
    filtering the global motion transforms with a plurality of test filters to generate a plurality of test smoothed global motion transform sets, each of the plurality of test filters having any of 0 through m future taps, wherein 0<m<n; and
    determining a truncated filter future tap count based at least in part on the set of baseline smoothed global motion transforms and the plurality of test smoothed global motion transform sets, wherein the truncated filter future tap count is greater than zero, wherein the determining the truncated filter future tap count includes:
        determining errors between the set of baseline smoothed global motion transforms and each of the plurality of test smoothed global motions transforms sets;
        determining an inflection point along an error-future tap count curve based on the errors and the number of future taps in the plurality of test filters; and
        selecting as the truncated filter future tap count, a number of future taps near the future tap count coordinate of the inflection point.

8. The method of claim 7, wherein the determining global motion transforms, the filtering the global motion transforms with a baseline filter, and the filtering the global motion transforms with a plurality of test filters are performed for a plurality of additional video segments to generate additional errors, the error-future tap count curve based on an average of the errors and the additional errors.

9. The method of claim 7, further comprising increasing the truncated filter future tap count in response to determining that a video processing pipeline can tolerate an increase in latency associated with the increase in the truncated filter future tap count.

10. Nonvolatile computer-readable storage media having encoded thereon computer-executable instructions for causing a computer system programmed thereby to perform digital video stabilization, the digital video stabilization comprising:
    for at least one frame of a plurality of frames of a video segment, determining at least one global motion transform representing jittery video motion;
    applying temporal smoothing to the at least one global motion transform to produce at least one smoothed global motion transform, the applying temporal smoothing utilizing a filter comprising a number of future taps and a number of past taps, the number of future taps and the number of past taps each being greater than zero, and the number of future taps being less than the number of past taps;
    processing the at least one of the frames of the video segment based on the at least one smoothed global motion transform to compensate for jittery video motion; and after the processing based on the at least one smoothed global motion transform, outputting the processed at least one of the frames of the video segment for display or subsequent processing.

11. The computer-readable storage media of claim 10, wherein the digital video stabilization further comprises:
as part of the determining the at least one global motion transform, processing local motion vectors of each frame of the at least one frame of the plurality of frames of the video segment to produce the at least one global motion transform.

12. The computer-readable storage media of claim 10, wherein the at least one global motion transform is based on a similarity model of video motion.

13. The computer-readable storage media of claim 10, wherein the filter is a truncated smooth filter.

14. The computer-readable storage media of claim 10, wherein the number of future taps is greater than or equal to 2 and less than or equal to 4.

15. The computer-readable storage media of claim 10, wherein the number of future taps is determined from test result data indicating a tradeoff between stabilization quality and the number of future taps or past taps in the filter.

16. The computer-readable storage media of claim 10, wherein the video segment is a first video segment having a first frame rate, and wherein the digital video stabilization further comprises:
determining that a second video segment has a second frame rate that is different from the first frame rate; and
scaling the number of future taps based on the second frame rate to produce a scaled number of future taps.

17. The computer-readable storage media of claim 10, wherein the digital video stabilization further comprises:
increasing the number of future taps in response to determining that a video processing pipeline can tolerate an increase in latency associated with the increase in the number of future taps.

18. The method of claim 1, wherein the video segment is a first video segment having a first frame rate, the method further comprising:
determining that a second video segment has a second frame rate that is different from the first frame rate; and
scaling the number of future taps based on the second frame rate to produce a scaled number of future taps.

19. The method of claim 1, further comprising:
increasing the number of future taps in response to determining that a video processing pipeline can tolerate an increase in latency associated with the increase in the number of future taps.

20. A system for stabilizing digital video comprising:
a filter with a number of future taps and a number of past taps, the number of future taps and the number of past taps each being greater than zero, and the number of future taps being less than the number of past taps;
a buffer storing at least one frame of a plurality of frames of a video segment;
a device comprising:
a processor;
a memory;
wherein the memory contains code that, when executed causes the processor to:
determine at least one global motion transform representing jittery video motion of the least one frame of a plurality of frames of a video segment stored in the buffer;
utilize the filter to apply temporal smoothing to the at least one global motion transform to produce at least one smoothed global motion transform;
process the at least one of the frame of a plurality of frames of a video segment based on the at least one smoothed global motion transform to compensate for the jittery video motion; and
output the processed at least one of the frames of the video segment for display or subsequent processing.

21. The system of claim 20, wherein the code, when executed, further causes the processor to:
process local motion vectors of each frame of the at least one frame of the plurality of frames of the video segment to produce the at least one global motion transform.

22. The system of claim 20, wherein the at least one global motion transform is based on a similarity model of video motion.

23. The system of claim 20, wherein the filter is a truncated smooth filter.

24. The system of claim 20, wherein the number of future taps is greater than or equal to 2 and less than or equal to 4.

25. The system of claim 20, wherein the number of future taps is determined from test result data indicating a tradeoff between stabilization quality and the number of future taps or past taps in the filter.

26. The system of claim 20, wherein the video segment is a first video segment having a first frame rate, and wherein the code, when executed, further causes the processor to:
determine that a second video segment has a second frame rate that is different from the first frame rate; and
scale the number of future taps based on the second frame rate to produce a scaled number of future taps.

27. The system of claim 20, wherein the code, when executed, further causes the processor to:
increase the number of future taps in response to determining that a video processing pipeline can tolerate an increase in latency associated with the increase in the number of future taps.

* * * * *